United States Patent
Hamby

(10) Patent No.: US 11,550,924 B2
(45) Date of Patent: Jan. 10, 2023

(54) AUTOMATED AND CONTINUOUS RISK ASSESSMENT RELATED TO A CYBER LIABILITY INSURANCE TRANSACTION

(71) Applicant: G-Software, Inc., Hoschton, GA (US)

(72) Inventor: Stephen G. Hamby, Hoschton, GA (US)

(73) Assignee: G-Software, Inc., Hoschton, GA (US)

( * ) Notice: Subject to any disclaimer, the term of this patent is extended or adjusted under 35 U.S.C. 154(b) by 373 days.

(21) Appl. No.: 16/914,791

(22) Filed: Jun. 29, 2020

(65) Prior Publication Data

US 2020/0394314 A1  Dec. 17, 2020

Related U.S. Application Data

(63) Continuation of application No. 15/042,742, filed on Feb. 12, 2016, now Pat. No. 10,699,018.

(60) Provisional application No. 62/129,247, filed on Mar. 6, 2015, provisional application No. 62/116,717, filed on Feb. 16, 2015.

(51) Int. Cl.
*G06F 21/57* (2013.01)
*G06Q 40/08* (2012.01)

(52) U.S. Cl.
CPC .......... *G06F 21/577* (2013.01); *G06Q 40/08* (2013.01)

(58) Field of Classification Search
CPC .............................. G06F 21/577; G06Q 40/08
USPC ............................................................ 705/50
See application file for complete search history.

(56) References Cited

U.S. PATENT DOCUMENTS

| | | | | |
|---|---|---|---|---|
| 8,494,955 B2 * | 7/2013 | Quarterman | ........... | G06Q 40/08 705/50 |
| 2005/0144480 A1 * | 6/2005 | Kim | ........... | G06N 7/005 726/4 |
| 2011/0072506 A1 * | 3/2011 | Law | ........... | H04L 63/1416 726/11 |
| 2012/0224057 A1 * | 9/2012 | Gill | ........... | G06F 21/55 348/143 |
| 2013/0104236 A1 * | 4/2013 | Ray | ........... | H04L 63/1408 726/25 |

(Continued)

OTHER PUBLICATIONS

Ogut ("Information Technology Security Risk Management", Jul. 31, 2006, 157 pages) (Year: 2006).*

(Continued)

*Primary Examiner* — James D Nigh
(74) *Attorney, Agent, or Firm* — Edell, Shapiro & Finnan, LLC

(57) ABSTRACT

Systems, methods, and computer program products for evaluating situational awareness of a cyberspace operational environment in a security control server in connection with a cyber-liability insurance transaction. The system may include a security control server that generates a model representing a cyber-liability insurance transaction. The security control server may further generate a ranked list of recommended security controls that are designed to reduce cyber-risks, and thereby the premium, associated with the cyber-liability insurance transaction model. Additionally, the security control server may continuously and automatically monitor one or more security controls implemented by a cyber-liability insurance consumer to insured information technology assets to evaluate compliance with the cyber-liability insurance transaction model.

15 Claims, 18 Drawing Sheets

(56) References Cited

U.S. PATENT DOCUMENTS

2015/0381649 A1* 12/2015 Schultz .............. G06Q 10/0635
726/25
2016/0134653 A1* 5/2016 Vallone ................ H04L 41/046
726/25

OTHER PUBLICATIONS

James J. Cebula, et al., A Taxonomy of Operational Cyber Security Risks, Software Engineering Institute, Dec. 2010, 47 pages, http://www.sei.cmu.edu.
A Buyer's guide to Cyber Insurance, Oct. 2, 2013, 4 pages, http://www.mcguirewoods.com/Client-Resources/Alerts/2013/10/Buyers-Guide-to-Cyber-Insurance.aspx.
Kellie Varas, CFE, A Dynamic Fraud Model With a Holistic Approach, accessed Dec. 23, 2014, 23 pages.
Link, John W., et al., Creating an Adaptive Cybersecurity Culture Through the Agile Cybersecurity Action Plan (ACAP), Dec. 2014, 14 pages.
Casualty Insurers Resist Coverage for Cyber Claims, Mar. 11, 2014, 3 pages.
Torsten, George, Coming into Focus: Cyber Security Operational Risk, May 21, 2015, 2 pages, SecurityWeek.Com.
Herath, Hemantha S.B., et al., Copula-based actuarial model for pricing cyber-insurance policies. Insurance Markets and Companies: Analyses and Actuarial Computations, vol. 2, Issue 1, 2011, 14 pages.
The Critical Security Controls for Effective Cyber Defense, Council on CyberSecurity, Version 5.0, accessed Jun. 17, 2016, 106 pages.
Untitled Article on Cyber Attacks and Small Businesses, accessed Oct. 23, 2014, 3 pages.
Cyber Attack Vector Taxonomy v2, accessed Jun. 16, 2016, one page.
Baer, Walter S., et al., Cyberinsurance in IT Security Management, Managing Organizational Security, IEEE Security and Privacy, May/Jun. 2007, 7 pages.
Herath, Hemantha S.B., et al., Cyber-Insurance: Copula Pricing Framework and Implications for Risk Management, accessed Aug. 20, 2014, 14 pages.
Gregory J. Millman, Cyber Insurance Buyer's Guide, accessed Aug. 22, 2014, 2 pages.
Cyber Insurance: Do Benefits Outweigh Costs, accessed Aug. 20, 2014, 2 pages.
Chris Simmons, et al., AVOIDIT: A Cyber Attack Taxonomy, Department of Computer Science, University of Memphis, Memphis, TN, USA, accessed May 31, 2016, 9 pages.
Gallagher & Co., Arthur J., Gallagher CyberRisk, Tailored Solutions for CyberRisk and Professional Liability, accessed Aug. 20, 2014, 8 pages.
Driving Data from Progressive's Usage-Based Car Insurance Program Hits 10 Billion Miles, accessed Oct. 16, 2014, 2 pages.
Board of Governors of the Federal Reserve System Office of the Comptroller of the Currency, Supervisory Guidance on Model Risk Management, SR Letter 11-7, Apr. 4, 2011, 21 pages.
Toregas, Costis, et al., Insurance for Cyber Attacks: The Issue of Setting Premiums in Context, Cyber Security Policy and Research Institute, The George Washington University, Jan. 7, 2014, 20 pages.
Berg, Daniel, DnBNOR Asset Management, Using Copulas, An Introduction for Practitioners, Norwegian ASTIN society, Oslo—Nov. 2008, 62 pages.
Trivedi, Pravin K. et al., Copula Modeling: An Introduction to Practioners, Foundations and Trends in Econometrics, vol. 1, No. 1 (2005) 1-111 (c)2007 P.K. Trivedi and D.M. Zimmer, DOI: 10.1561/0800000005, 111 pages.
Paul B. Kurtz, Cyber-Insurance Metrics and Impact on Cyber-Security, Homeland Security Council, accessed Aug. 20, 2014, 8 pages.
Managing Cyber Security as a Business Risk: Cyber Insurance in the Digital Age, Sponsored by Experian Data Breach Resolution, Independently conducted by Ponemon Institute LLC, Aug. 2013, 26 pages.
Dorey, Martyn, et al. Modelling Copulas, The Staple Inn Actuarial Society, accessed Aug. 20, 2014, 27 pages.
Success of Progressive Snapshot, Sep. 4, 2013, one page.
Kellie Varas, CFE, Threats and Controls, accessed Mar. 4, 2015, 82 pages.
Using Captives to Manage Cyber Risk, Mar. 17, 2014, 2 pages.
Bohme, Rainer, et al., Modeling Cyber-Insurance: Towards a Unifying Framework, Working Paper, ICSI and UC Berkeley, accessed Aug. 20, 2014, 36 pages.

* cited by examiner

| AlertType | ▲ | Frequency ▲▼ | Notification ▲▼ | Type ▲▼ | Action |
|---|---|---|---|---|---|
| Norton anti virus | | Monthly | test123@gmail.com | SMS | 820b—✏ |
| McAfee Security Essentials | | Weekly | tset@gmail.com | SMTP | ✏ 🗑 |
| McAfee Security Essentials | | Daily | 9966780504 | SMS | ✏ 🗑 |
| Quick Heal Total Security | | Daily | vcvczx | SMS | ✏ 🗑 |
| McAfee Security Essentials | | Hourly | patni.harshal@gmail.com | SMS | ✏ 🗑 |

Previous [1] Next

New Alert

FIG. 8A

| Threat | Threat Group | Rank | Information Asset | Mitigated |
|---|---|---|---|---|
| External | Legislative Event | 1 | Reston Data Center | x |
| External | Litigation Event | 1 | Reston Data Center | x |
| External | Volcanic Event | 1 | Reston Data Center | |
| External | Weather event | 1 | Reston Data Center | x |

Risk assessment for July 07, 2015 at 11:39:09 GMT.

FIG. 8C

Home > Risk Assessment > Grid

Tab 1 | Tab 2

Search by Risk
[Select Risk ▼]

| Risk | Security Control |
|---|---|
| LegislativeEvent | AuditandAccountabilityPolicyandProcedures, AuditEvents |
| ChangeManagementEvent | AccountManagementControl, BaselineConfiguration, LeastPrivilege, ConfigurationManagementPolicyandProcedures, ConfigurationSettings, UserinstalledSoftware, SegregationOfDutiesControl, ConfigurationChangeControl, SecurityImpactAnalysis, AccessRestrictionsforChange |
| Hazard | AlternateSecurityMechanisms, SafeMode, TelecommunicationsServices, AlternateProcessingSite, InformationSystemRecoveryandReconstitution, InformationSystemBackup, EmergencyLighting, AlternateWorksite, EmergencyShutoff, EmergencyPower, RoleBasedSecurityTraining, LocationofInformationSystemComponents, ContingencyPlanningPolicyandProcedures, ContingencyPlanTesting, FailSafeProcedures, AlternateStorageSite, ContingencyTraining, ContingencyPlan |
| SecurityControlEvent | CovertChannelAnalysis, CustomizedDevelopementofCriticalComponents, ConfigurationChangeControl, BaselineConfiguration, AccessRestrictionsforChange, SecurityImpactAnalysis, HoneyClients, Honeypots, ConfigurationSettings, segregationOfDutiesControl, MaliciousCodeProtection, LeastPrivilege, ConfigurationManagementPolicyandProcedures, FlawRemediation |
| TrainingEvent | IncidentResponseTraining, ContingencyTraining, PersonnelSecurityPolicyandProcedures, InformationSharingwithThirdParties, PositionRiskDesignation, PubliclyAccessibleContent, ContingencyPlanTesting, ComponentAuthenticity, AccessAgreements, RulesofBehavior, SecurityTrainingRecordsControl, DeveloperProvidedTraining, RoleBasedSecurityTraining, PersonnelScreening, ThirdpartyPersonnelSecurity, SecurityAwarenessandTrainingPolicyandProcedures, SecurityAwarenessTraining |
| SystemEvent | TamperResistanceandDetection, AlternateProcessingSite, SessionAuthenticity, ProtectionofAuditInformation, WirelessLinkProtection, TrustedPath, TransmissionConfidentialityandIntegrity, InformationInputValidation, ExternalInformationSystemServices, UnsuccessfulLoginControl, DeveloperConfigurationManagement, TransmissionofSecurityAttributes, SecurityAttributes, MaintenancePersonnel, CovertChannelAnalysis, SessionTermination, AlternateCommunicationsProtocols, SupplyChainProtection, SecureNameAddressResolutionServiceRecursiveCachingResolver, CriticalityAnalysis, OutofBandChannels, AllocationofResources, ErrorHandling, SecurityEngineeringPrinciples, VoiceOverinternetProtocol, InformatioOutputFiltering, MaliciousCodeProtection, InventoryofPersonallyIdentifiableInformation, accessEnforcement, TelecommunicationsServices, IdentificationandAuthenticationOrganizationalUsers, SafeMode, UsageRestrictions, Trustworthiness, InformationSecurityArchitecture, ResourceAvailibility, SecureNameAddressResolutionServiceAuthoritativeSource, DeveloperSecurityArchitectureandDesign, BoundaryProtection, CryptographicKeyEstablishmentandManagement, DistributedProcessingandStorage, SecurityAlertsAdvisoriesandDirectives, ArchitectureandProvisioningforNameAddressResolutionService, AlternateAuditCapability, InformationSystemPartitioning, IdentificationandAuthenticationNonOrganizationalUsers, AuthenticationFeedback, SecurityFunctionIsolation, Heterogeneity, SecurityFunctionVerification, NonModifiableExecutablePrograms, ConfigurationManagementPlan, IdentifierManagement, AuthoritiveTimestampControl, SystemMaintenancePolicyandProcedures, Concurrents |

Alerts
Risk Assessment
  Configure
  Review/Update Assessment
  Grid View
Security Controls
Survey Logout

FIG. 8D

| Control Name ▲ | Port ▲ | Process Name ▲ | Action |
|---|---|---|---|
| Quick Heal Total Security | 875 | quick.exe | ✎ |
| McAfee Security Essentials | 8458 | McAfeeSS.exe | ✎ 820b 🗑 820c |
| Norton anit virus | 7890 | norton.exe | ✎ 🗑 |
| mbig21312 | 46162132 | igjhv | ✎ 🗑 |
| sdjgsdjdb | 99546541 | nzvnxvb | ✎ 🗑 |
| nvmcbm | 31213213 | mnbcmbmc | ✎ 🗑 |
| Quick Heal Total Security23 | 4421 | lmn@25 | ✎ 🗑 |
| controlname1 | 6690 | process80 | ✎ 🗑 |
| controlname1 | 6090 | process123 | ✎ 🗑 |

Showing 1 to 9 of 9 entries    Previous [1] Next

New Alert — 820a

FIG. 8E

| Control Name | Port | Process Name | Host | Information Asset | Monitor Status | Monitor Performance | Action |
|---|---|---|---|---|---|---|---|
| Norton anit virus | 7890 | norton.exe | 256 | TIEMPA HR | ☑ | ☐ | |
| Quick Heal Total Security | 675 | quick.exe | 789 | TIEMPA HR | ☑ | ☑ | |
| McAfee Security Essentials | 8458 | McAfeeSS.exe | imn | TIEMPA HR | ☑ | ☐ | |
| Quick Heal Total Security23 | 4421 | imn@25 | ccv | TIEMPA HR | ☐ | ☐ | |
| Quick Heal Total Security | 875 | quick.exe | 123423 | SAP Financials | ☐ | ☑ | |
| Norton anit virus | 7890 | norton.exe | dfzd | SAP Financials | ☑ | ☐ | |
| Quick Heal Total Security | 875 | quick.exe | ok@123.12 | SAP Financials | ☐ | ☑ | |
| McAfee Security Essentials | 8458 | McAfeeSS.exe | 1234 | Reston Data Center | ☑ | ☑ | |
| Quick Heal Total Security23 | 4421 | imn@25 | jhgjgjk | Reston Data Center | ☐ | ☐ | |
| McAfee Security Essentials | 8458 | McAfeeSS.exe | 1245@ | Goodyear Data Center | ☑ | ☑ | |
| Norton anit virus | 7890 | norton.exe | tyu | Goodyear Data Center | ☐ | ☐ | |
| McAfee Security Essentials | 8458 | McAfeeSS.exe | localhost | Goodyear Data Center | ☑ | ☑ | |

Cyber Security Insurance Policy Risk Assessment

This application is used for new policies

0% [====================] 100%

Information Security Policy

* Has the Applicant implemented a formal information security policy that is applicable to all business units?

● Yes   ○ No

* Does the Applicant test the security controls required by the policy at least annually?

● Yes   ○ No

* Does the Applicant continuously monitor the security controls required by the policy to ensure they are operational?

○ Yes   ● No

* Does the Applicant regularly identify and assess new threats, and adjust the policy to address new threats?

○ Yes   ● No

* Does the Applicant's information security policy address the storage and processing of PII and other confidential information on laptop and mobile devices?

● Yes   ○ No

* Does the Applicant's information security policy identify and describe acceptable use of information assets for all users?

○ Yes   ● No

[Resume later]        [◀ Previous]  [Submit]          [Exit and clear survey]

FIG. 9

AUTOMATED AND CONTINUOUS RISK ASSESSMENT RELATED TO A CYBER LIABILITY INSURANCE TRANSACTION

CROSS REFERENCE TO RELATED APPLICATIONS

This application is a continuation of U.S. patent application Ser. No. 15/042,742, filed on Feb. 12, 2016, which claims priority from U.S. provisional application Ser. No. 62/116,717, filed Feb. 16, 2015, and U.S. provisional application Ser. No. 62/129,247, filed Mar. 6, 2015, all of which are incorporated by reference herein in their entirety.

TECHNICAL FIELD

The present invention relates to systems and methods for evaluating and monitoring cyber threats and controls for automated and continuous risk assessment related to a cyber-liability insurance transaction.

BACKGROUND

The growth of networked computer systems has directly or indirectly resulted in the increased frequency and complexity of cyber-attacks to these systems. A cyber-attack may be an attempt by a person (e.g., a hacker) to effectuate a cyber-threat that, for example, damages or destroys a cyberspace operational environment. For example, a cyber-threat may be an event that has the potential to adversely affect a cyberspace operational environment, e.g., such as data loss. A cyber risk may be the potentially adverse outcomes related to the occurrence of a cyberthreat, e.g., such as a lawsuit resulting from damages to customers from loss of their personally identifiable information.

Several security controls exist to counter the cyber threats associated with cyberattacks and thereby reduce the risks to organizational capabilities that rely on cyber-based Information Technology (IT) assets. However, such security controls may be expensive to implement. Thus, organizations typically do not implement all of the possible combinations of security controls available in the market, and instead look for a tradeoff in cost of security control implementation to risks mitigated.

Cyber liability insurance has evolved as the most prevalent mechanism to transfer the risk of cyber threats in a cyberspace operational environment to a third-party. In a typical cyber liability insurance transaction, an insurance provider may advertise a policy with rules and coverages at a specific premium. Organizations that want to defray the risks covered in that policy, based on the specific rules, and are willing to pay the premium, purchase the policy. The rules and coverages determine the contractual guidelines of the policy, and although they may derive from standard cyber threat models, each policy has its own specific set of rules and coverages. For example, a standard threat model may identify the transmission of personally identifiable information in unencrypted formats over an open network to be a significant threat. However, if that specific threat is not relevant to the contractual coverages and rules of a policy, then it may not be applicable to a cyber-risk assessment specific to the policy.

SUMMARY

Systems, methods, and computer program products for a security control system are disclosed that generate a novel model that represents a cyber-liability insurance transaction. In some embodiments, the security control system may further recommend and/or monitor security controls designed to mitigate cyber-risks and threats to a cyberspace operational environment. The recommendation and/or monitoring of security controls may be performed in connection with a cyber-liability instrument, such as an insurance transaction.

In one aspect, embodiments are disclosed that assess risk associated with a cyber-liability transaction pertaining to one or more insured devices.

Embodiments are further disclosed that evaluate situational awareness of a cyberspace operational environment and recommend security controls to reduce risks, and thereby the premium, associated with a cyber-liability instrument. The systems, methods, and computer program products may produce a ranked list of security controls— specific to a cyber-liability instrument, such as an insurance policy—that can be applied to the insured information technology (IT) assets or devices within an enterprise to optimize the security posture of the insured IT assets, and thereby, reduce the risks specific to the cyber liability insurance transaction. It will be appreciated that the embodiments disclosed herein provide a technical solution to a problem arising in the field of networked computer systems by making it possible to determine and implement the next-best possible security control to both improve organizational security posture (mitigation of risks associated with cyber threats) and reduce cyber liability insurance transaction premiums.

Additionally, embodiments are disclosed that continuously evaluate and monitor cyber threats and controls. When used in conjunction with software security controls, they provide a technological improvement to computer technology for the evaluation and monitoring of cyber threats that provides the ability to assess and assign liability in a cyber-insurance transaction between parties.

In one aspect, a method performed by a security control server to assess risk associated with a cyber-liability insurance transaction pertaining to an insured device is disclosed. The method includes the step of transmitting, from the security control server, a configuration screen including a selectable list of a plurality of cyber-risks. The method includes the step of receiving, at the security control server, a selection of one or more of the cyber-risks. The method includes the step of receiving, at the security control server, information on each of one or more security controls associated with the one or more selected cyber-risks, wherein the information includes an indication of whether each of the one or more security controls has been implemented on the insured device or has not been implemented on the insured device. The method includes the step of mapping, by the security control server, the information for each of the one or more security controls to the one or more selected cyber-risks. The method includes the step of generating, by the security control server, a set of policy axioms from the mappings, wherein the cyber-liability insurance transaction is represented as the set of policy axioms. The method includes storing, by the security control server, the policy axioms in a knowledgebase. The method includes generating, by the security control server, a list of mitigated and non-mitigated cyber risks based on the policy axioms. The method includes transmitting, by the security control server, the list of mitigated and non-mitigated cyber risks to a client device.

In some embodiments, the method of may further include the step of generating, at the security control server, a plurality of recommended security controls based on the list of mitigated and non-mitigated cyber risks. The method may further include the step of calculating, at the security control server, a first ranking for each of the recommended security controls using a programmed heuristic. The method may further include the step of calculating, at the security control server, a second ranking for each of the recommended security controls using a machine learning algorithm. The method may further include the step of ranking, at the security control server, the recommended security controls using weighted values of the first ranking and the second ranking for each of the recommended security controls. The method may further include the step of transmitting, by the security control server, a list of the recommended security controls ordered according to the ranking.

In some embodiments, the method may further include the step of accessing, by the security control server, the policy axioms from the knowledgebase. The method may further include the step of for each of the accessed policy axioms, generating, at the security control server, an entry for an external monitoring configuration. The method may further include the step of transmitting, by the security control server, the external monitoring configuration to the insured device. The method may further include the step of receiving, at the security control server, an alert from the insured device.

In some embodiments, the external monitoring configuration includes information on one or more of: a name of a process that implements a security control, a host identifier, and an alert mechanism.

In some embodiments, the alert is transmitted by one or more monitoring agents executing on the insured device. The alert may be transmitted to the security control server. Additionally, the security control server may issue a notification, e.g., to a client device, in response to an alert from a monitoring agent executing on an insured device.

In some embodiments, the one or more monitoring agents monitor one more security controls implemented in the insured device in accordance with the external monitoring configuration.

In some embodiments, the alert indicates that one or more of the one or more security controls implemented on the insured device fails to be operational.

In some embodiments, the method includes the step of continuously and automatically monitoring each of the one or more security controls implemented in the insured device. In some embodiments, the method may further include the step of generating, by the security control server, a report indicating a change in the operation status or performance of one or more of the one or more security controls implemented in the insured device.

In another aspect, a security control server for assessing risk associated with a cyber-liability insurance transaction pertaining to an insured device is provided. The server includes a processor, a memory coupled to the processor, a knowledgebase, and a network interface coupled to a network. The processor is configured to transmit a configuration screen including a selectable list of a plurality of cyber-risks. The processor is configured to receive a selection of one or more of the cyber-risks. The processor is configured to receive information on each of one or more security controls associated with the one or more selected cyber-risks, wherein the information includes an indication of whether each of the one or more security controls has been implemented on the insured device or has not been implemented on the insured device. The processor is configured to map the information for each of the one or more security controls to the one or more selected cyber-risks. The processor is configured to generate a set of policy axioms from the mappings, wherein the cyber-liability insurance transaction is represented as the set of policy axioms. The processor is configured to store the policy axioms in the knowledgebase. The processor is configured to generate a list of mitigated and non-mitigated cyber risks based on the policy axioms. The processor is configured to transmit the list of mitigated and non-mitigated cyber risks to a client device.

In some embodiments, the processor is further configured to generate a plurality of recommended security controls based on the list of mitigated and non-mitigated cyber risks. The processor is configured to calculate a first ranking for each of the recommended security controls using a programmed heuristic. The processor is configured to calculate a second ranking for each of the recommended security controls using a machine learning algorithm. The processor is configured to rank the recommended security controls using weighted values of the first ranking and the second ranking for each of the recommended security controls. The processor is configured to transmit a list of the recommended security controls ordered according to the ranking.

In some embodiments, the processor is further configured to access the policy axioms from the knowledgebase; for each of the accessed policy axioms, generate an entry for an external monitoring configuration; transmit the external monitoring configuration to the insured device; and receive an alert from the insured device.

In some embodiments, the processor is further configured to continuously and automatically monitor each of the one or more security controls implemented in the insured device.

In some embodiments, the processor is further configured to generate a report indicating a change in the operation status or performance of one or more of the one or more security controls implemented in the insured device.

In another aspect, a computer program product for assessing risk associated with a cyber-liability insurance transaction pertaining to an insured device is provided. The computer program product includes a non-transitory computer readable medium containing instructions for a processor to transmit a configuration screen including a selectable list of a plurality of cyber-risks. The instructors for a processor further include receive a selection of one or more of the cyber-risks. The instructors for a processor further include receive information on each of one or more security controls associated with the one or more selected cyber-risks, wherein the information includes an indication of whether each of the one or more security controls has been implemented on the insured device or has not been implemented on the insured device. The instructors for a processor further include map the information for each of the one or more security controls to the one or more selected cyber-risks. The instructors for a processor further include generate a set of policy axioms from the mappings, wherein the cyber-liability insurance transaction is represented as the set of policy axioms. The instructors for a processor further include store the policy axioms in a knowledgebase. The instructors for a processor further include generate a list of mitigated and non-mitigated cyber risks based on the policy axioms. The instructors for a processor further include transmit the list of mitigated and non-mitigated cyber risks to a client device.

In some embodiments, the computer readable medium contains further instructions for a processor to generate a plurality of recommended security controls based on the list of mitigated and non-mitigated cyber risks; calculate a first ranking for each of the recommended security controls using a programmed heuristic; calculate a second ranking for each of the recommended security controls using a machine learning algorithm; rank the recommended security controls using weighted values of the first ranking and the second ranking for each of the recommended security controls; and, transmit a list of the recommended security controls ordered according to the ranking.

In some embodiments, the computer readable medium contains further instructions for a processor to access the policy axioms from the knowledgebase; for each of the accessed policy axioms, generate an entry for an external monitoring configuration; transmit the external monitoring configuration to the insured device; and receive an alert from the insured device.

In some embodiments, the computer readable medium contains further instructions for a processor to continuously and automatically monitor each of the one or more security controls implemented in the insured device.

The above and other aspects and embodiments are described below.

BRIEF DESCRIPTION OF DRAWINGS

FIG. 8A is an illustrative workspace display depicting an alert configuration screen, according to some embodiments of the present invention.

FIG. 8C is an illustrative workspace display depicting a risk assessment review/update assessment screen, according to some embodiments of the present invention.

FIG. 8D is an illustrative workspace display depicting a risk assessment grid screen, according to some embodiments of the present invention.

FIG. 8F is an illustrative workspace display depicting a security control configuration screen, according to some embodiments of the present invention.

FIG. 9 is an illustrative workspace display depicting a cyber security insurance policy risk assessment questionnaire screen, according to some embodiments of the present invention.

DETAILED DESCRIPTION

The embodiments disclosed herein, although specifically addressing the cyber-liability insurance transaction, are not limited to insurance policy transactions so named. The embodiments disclosed herein may be used for any transaction intended to assign cyber operational environment risks to a third-party, where the level of risk incurred by the third-party is an important factor in the pricing of the assigning instrument, which in the example embodiments herein is a cyber-liability insurance policy. Simply naming an insurance policy as a data loss prevention policy, or some other name, does not imply that the methods and systems claimed herein are not applicable. The parties to a cyber-liability insurance transaction may include an insurance provider and an insurance consumer. Together, the insurance consumer and insurance provider may agree on the rules, coverages, and the cyber threats and other vulnerabilities covered by an insurance policy.

The embodiments disclosed herein may be applicable in providing critical guidance to facilitate usage-based insurance (UBI) for the cyber insurance market. The disclosed embodiments provide tools for: discovery, by automating the evaluation process for systems and datasets and assessment of implemented security controls; detection, by monitoring the security controls discovered and/or mandated in a policy for each insured device or asset to ensure operability; and decision, by evaluating controls for alignment with agreed upon security taxonomy and determining vulnerability of security processes and security controls.

Figure 1:
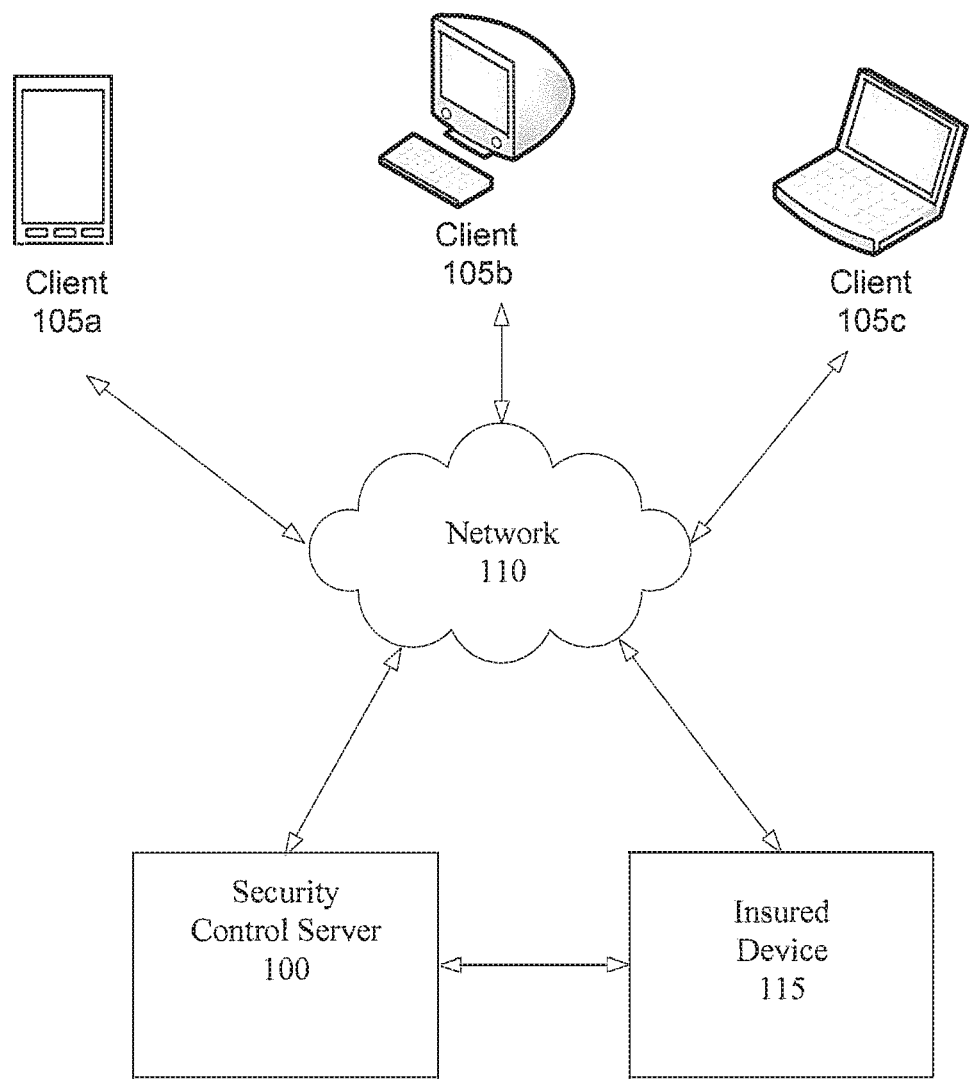
FIG. 1 is a schematic diagram showing a security control system architecture, according to some embodiments of the present invention.

FIG. 1 is a schematic diagram showing a security control system architecture, according to some embodiments of the present invention. FIG. 1 depicts a plurality of client devices 105a-c in electronic communication with a network 110. Client devices 105 may include, for example, personal communication devices such as a cell phone or tablet 105a, desktop computers 105b, and/or laptop computers 105c. Each client device 105 may comprise or be coupled to a display. The network 110 may be, for example, a local area network (LAN), a wireless local area network (WLAN), a wide area network (WAN) such as the Internet, etc. Client devices 105 may be operated by, for example, users associated with a party to a cyber-liability transaction, such as an insurance provider user or a cyber-customer user. As described in detail below, client devices 105 may exchange information with a security control server 100 over network 110.

In embodiments where network 110 is a LAN or WLAN, network 110 may be a private network that uses private Internet Protocol (IP) address space, such as those used for a home, office, or enterprise. For example, network 110 may be an enterprise private network built by an enterprise to interconnect its various company sites in order to share computer resources.

FIG. 1 further depicts a security control server 100 in electronic communication with network 110. As described in further detail below in connection with FIGS. 2 and 7, according to some embodiments, security control server 100 may include a processor, a non-transitory computer readable medium that contains instructions for the processor to implement the functions described below, a knowledgebase, and a network interface for communicating via network 110 with other networked devices, such as clients 105. In some embodiments, security control server 100 may be in electronic communication with an insured device 115 belonging to the insurance consumer. The security control server 100 may communicate with the insured device 115 directly via a wired or wireless connection or the security control server 100 may communicate with the insured device 115 via network 110.

In some embodiments, the security control server 100, like insured device 115, may also be covered by an insurance policy. In some embodiments, the security control server 100 may send a "heartbeat" or signal to a master server (not illustrated in FIG. 1) that supports the security control system architecture. When the heartbeat is broken, or security control server 100 fails to send a signal to the master server, such as when a cyber attack targets security control server 100, the master server may be alerted and may alert the insured customer (e.g., the insured risk manager) and the insurer.

Insured device 115 may comprise a computing device that is part of the insurance customer's cyberspace operational environment. The computing device may include a single computer or multiple computers. If the computing device includes multiple computers, the computers may operate individually or be connected via a network, such as a local area network (LAN), and/or a wide area network (WAN). For example, insured devices may include mobile devices, computers, and network devices. The policy may cover replacement and/or remediation costs with bringing the device back to operational state. For example, CryptLocker may hijack a person's computer making it unusable without paying a ransom. The policy may be triggered to remediate this (e.g., potentially remove CryptLocker in its entirety).

The cyberspace operational environment may refer to the environment in which computer communications occur and include the physical and cyber-physical or virtual components that host the cyberspace systems, networks, and their communications. For example, the cyberspace operational environment may include network infrastructure, such as a router or switch, one or more virtual or physical machines, databases, servers, computers, networked devices, mobile devices, etc. As described in further detail below in connection with FIG. 3, insured device 115 may include a monitoring agent and a software-enabled security control so that the insured device 115 may be monitored by the security control server 100.

Figure 2:
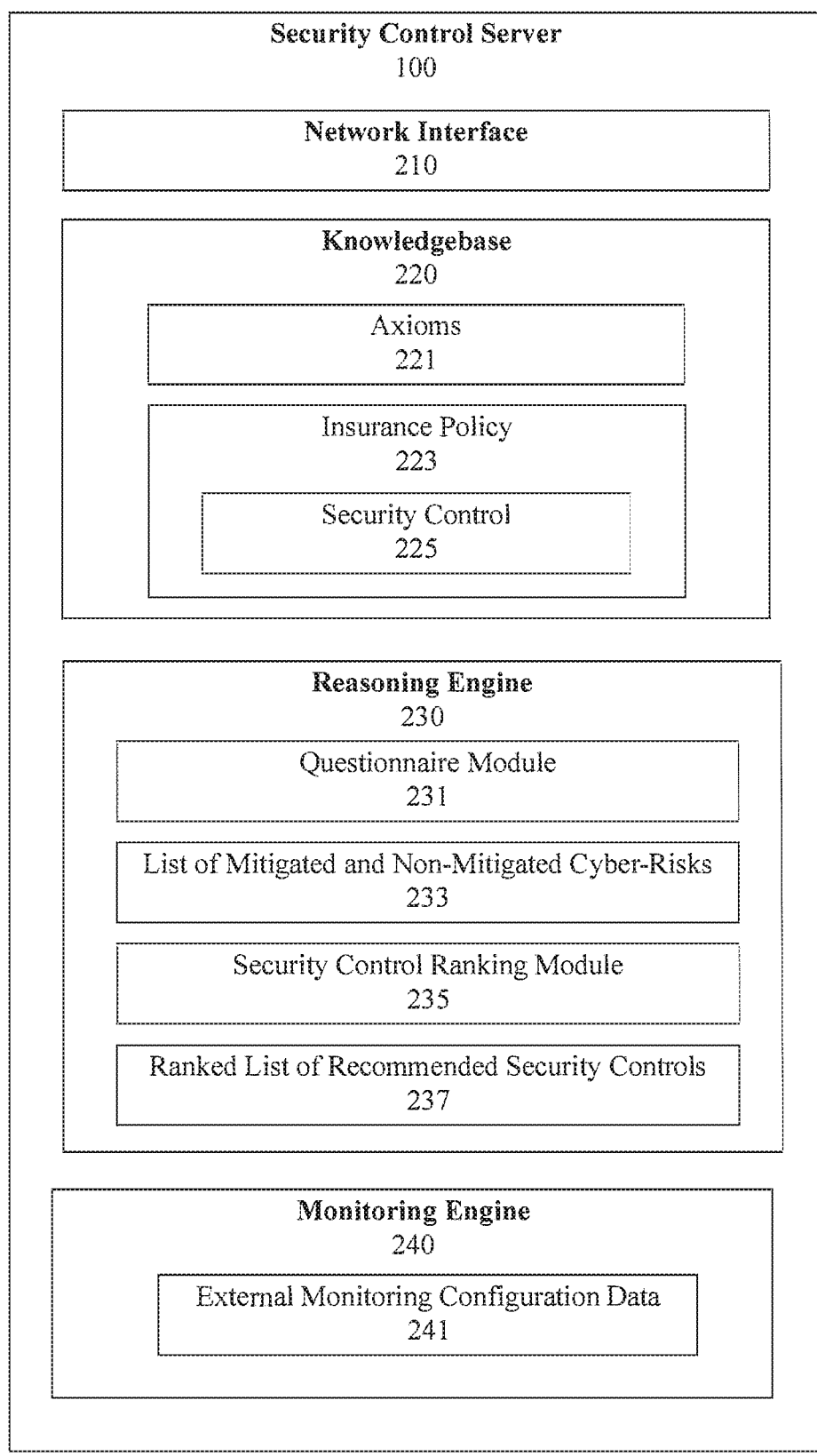
FIG. 2 is a block diagram showing logical components of a security control server, according to some embodiments of the present invention.

FIG. 2 is a block diagram of the logical components of a security control server 100, according to some embodiments. Security control server 100 may include, for example, a network interface 210, a knowledgebase 220, a reasoning engine 230, and/or a monitoring engine 240, each described in turn below.

In some embodiments, the logical components of security control sever 100 may be distributed across multiple physical or virtual computers. For example, the monitoring engine 240, or any of the other logical components, may be a third-party application.

The network interface 210 may enable the security control server 100 to electronically communicate with devices attached to a network 110. For example, as described below in connection with FIG. 7, the security control server 100 may include a processor that is configured to use a network interface 210 to exchange one or more messages or information to users, or client devices 105, as well as an insured device 115, via a network 110. In some embodiments, a delivery protocol may be used by the security control server 100 for transmitting such messages over network 110, such as, for example, the Internet Protocol (IP), Hypertext Transfer Protocol (HTTP), Secure HTTP (HTTPS), or an email protocol such as Simple Mail Transfer Protocol (SMTP), Post Office Protocol (POP), Messaging Application Programming Interface (MAPI), the Internet Message Access Protocol (IMAP), etc.

Figure 7:
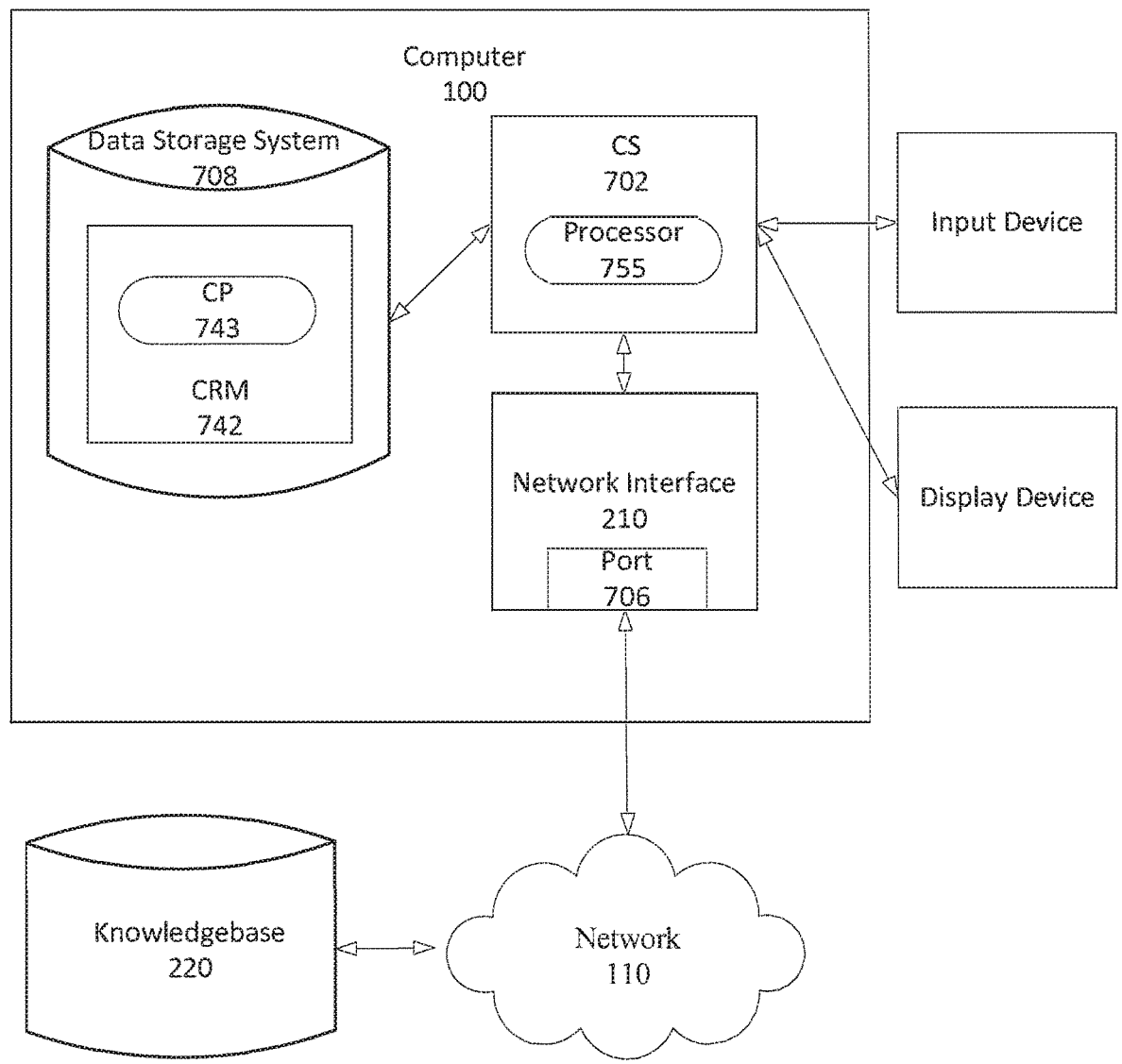
FIG. 7 is a block diagram of a security server apparatus, according to some embodiments of the present invention.

The knowledgebase 220 may comprise an electronic data store. In some embodiments, knowledgebase 220 may be coupled to security control server 100 in the same physical housing. In other embodiments, such as shown in FIG. 7, knowledgebase 220 may be in a separate physical housing from the security control server 100, e.g., a separate SQL database or other data store. In instances where the knowledgebase 220 is in a separate housing or device, security control server 100 may be in electronic communication with the knowledgebase 220, either via a direct connection or via network 110.

The knowledgebase 220 may contain generic knowledge of cyber threats, vulnerabilities, and security controls that are represented as generic axioms 221. The generic axioms 221 may be from any of a family of Description Logics Languages (DLL). The generic or description logic (DL) axioms may consist or comprise of minimal concept and role axioms that define the structure of cyber threats, cyber risks, cyber vulnerabilities, security controls, and role axioms, each described in turn below.

As one example, the following axiom may establish a subclass relationship for wireless security controls, such as aircrack-ng as an example.

```
<owl:Class
rdf:about="http://gsoftwareinc.com/ontologies/cyber/2014/11/OperationalCyberSecurityRisks#WirelessLinkProtection">
    <rdfs:label>Wireless Link Protection</rdfs:label>
    <rdfs:subClassOf
rdf:resource="http://gsoftwareinc.com/ontologies/cyber/2014/11/OperationalCyberSecurityRisks#CommunicationsProtectionControl"/>
</owl:Class>
```

As another example, the following axiom may establish that the controls in the subclass above mitigate cyber risks

```
<rdfs:subClassOf>
    <owl:Restriction>
        <owl:onProperty
rdf:resource="http://gsoftwareinc.com/ontologies/cyber/2014/11/OperationalCyberSecurityR
isks#mitigatedFrom"/>
        <owl:someValuesFrom
rdf:resource="http://gsoftwareinc.com/ontologies/cyber/2014/11/OperationalCyberSecurityR
isks#SystemandCommunicationsProtectionPolicyandProcedures"/>
    </owl:Restriction>
</rdfs:subClassOf>
```

Cyber threat: A cyber threat may be an event that has potential to adversely affect a cyberspace operational environment. For example, the threat of data loss or theft may be a cyber-threat.

Cyber Risk: A cyber risk may be the potentially adverse outcome or outcomes related to a cyber-threat occurring. For example, one cyber risk may be lawsuits resulting from damages to customers from loss of their personally identifiable information. Another cyber risk may be a loss of business caused by a loss of data that prevents IT assets from being available to conduct business.

Cyber vulnerability: A cyber vulnerability may be an instantiation of a cyber-threat or event. For example, one cyber vulnerability may be a SQL injection vulnerability that enables a hacker to hijack SQL calls from a web server to retrieve any data they desire.

Security Control: A security control may be a device, system, software, or other "control" that secures a system from being vulnerable to a specific vulnerability. For example, a security control may be the OWASP SQL injection pattern, which codes SQL calls from web servers in a specific way to prevent hackers from hijacking the SQL call.

Role Axiom: Role axiom may map security controls to cyber vulnerabilities; cyber vulnerabilities to cyber threats; and cyber threats to cyber risks. Role axioms may use transitive attributes such that, for example, security controls may be related to cyber risks via cyber vulnerabilities and cyber threats.

The cyber threats and vulnerabilities may include those defined in, for example, the CERT Cyber Risk Taxonomy, ISO 27001:2013, NIST Vulnerability Database, Cambridge Cyber Exposure Data Schema, PRISM, FAIR, or other sources. The security controls may be from, for example, NIST SP 800-53, ISO 27001:2013 Annex A, or other sources. In some embodiments, "other," or new, cyber threats, vulnerabilities, and security controls may be defined as one or more custom axioms in connection with a specific insurance policy.

The use of DL may be by design because it represents the decidable fragments of first-order logic, such that the decisions by the security control server 100 on mitigated vs. non-mitigated risks can be trusted, assuming the model is defined correctly by the insurance consumer and provider, and the consumer (insured) has provided correct information on the controls implemented. The model may be contractually relevant to the cyber liability insurance transaction in that it is the agreed upon representation of cyber threats, vulnerabilities, and security controls relevant to the transaction. Each of the DL individual axioms may contain the name(s) of the process(es) that implement the security control, the host identifier (either IP address or hostname that is valid addressable hostname), and the alert mechanism the agent should use to notify the computer (i.e. this software).

The knowledgebase 220 may additionally include one or more insurance policies 223 that are specific to a cyber-liability insurance transaction. In particular, when the parties of a cyber-liability insurance transaction, namely the insurance provider and the insurance consumer, agree on the rules, coverages, cyber threats and vulnerabilities covered by an insurance policy, such insurance policy 223 terms may be stored in the knowledgebase 220.

In some embodiments, the insurance policy 223 may be defined as a set of policy axioms. The policy axioms for an insurance policy 223 may be stored in the knowledgebase 220 from any of a family of DLL. In some embodiments, the policy axioms defining an insurance policy 223 may include one or more of the generic axioms 221 stored in knowledgebase 220. However, the insurance policy 223 may include one or more new or custom axioms in additional to or instead of the generic axioms 221. Thus, the knowledgebase 220 may contain insurance policies 223 that comprise a set of policy axioms that represent a unique agreement between an insurance provider and the insurance customer, including the specific rules, coverages, and cyber risks that are being transferred from the insured to the insurer.

Each policy axiom that makes up an insurance policy 223 may define one or more of a cyber-risk, cyber-vulnerability, and/or cyber-threat, each of which may be mapped to or associated with one or more security controls, e.g., through the use of role axioms. Thus, in addition to the cyber-risks, vulnerabilities, and/or threats encompassed by an insurance policy, the insurance policy 223 in knowledgebase 220 may further contain information from the insurance consumer about security controls 225 that exist in their operational environment that map to the insurance policy 223. As described above, the security control 225 may be represented in the form of an axiom in a DLL. A security control may be a device, system, software, or other "control" that secures a system from being vulnerable to a specific vulnerability.

The security control server 100 may further include a reasoning engine 230. The reasoning engine 230 may be responsible for generating the DLL axiom model, or insurance policy 223, that represents the specific rules, coverages, and cyber risk that are being transferred from the insured to the insurer via the cyber liability transaction. Once generated, this model may persist in the knowledgebase 220 as an insurance policy 223 comprising a set of axioms.

The reasoning engine 230 may define the cyber liability coverage for an insurance policy in a variety of ways. For example, in some embodiments, someone who is skilled in DL axioms may write the axioms custom to a policy 223, and that policy 223 may then persist in the knowledgebase 220.

In other embodiments, the security control server 100 may access the knowledgebase 220 and use axioms 221 relevant to a given cyber-liability insurance transaction to automatically generate questions about the security controls 225 required by an insurance policy 223 in order to mitigate the risks associated with the cyber threats and vulnerabilities covered by the policy 223. In such embodiments, the reasoning engine 230 may employ the questionnaire module 231 in order to define the cyber liability coverage associated with an insurance policy 223. The questionnaire module 231 may be used to generate a list of questions on relevant threats and vulnerabilities that are used to define the cyber liability coverage associated with an insurance policy 223. The questions may then be grouped into a questionnaire by the questionnaire module 231 to be delivered to the insurance consumer 105 via the network interface 210 and network 110. In embodiments where server 100 is distributed across multiple physical or virtual computers, the questionnaire module 231 may be operated by a third-party.

The reasoning engine 230 may employ the questionnaire module 231 to generate questions and assemble the questions into a questionnaire format for delivery to an insurance consumer end user device 105. The questionnaire may be formatted, for example, as an HTML page or other document format, and the questionnaire may be delivered via the network interface 210 to an insurance consumer operating a client device 105. The questionnaire may be delivered via the network interface 210 to a client device 105 using HTTP, HTTPS, email, or another electronic delivery protocol. The questionnaire may then be displayed through a GUI on the display of a client device 105. An example illustrative workspace display with a questionnaire screen 900 is depicted in FIG. 9, discussed below.

In some embodiments, the questionnaire may include one or more questions relating to one or more security controls 225 that an insurance consumer should have implemented in order to mitigate risks associated with the threats and vulnerabilities applicable to the transaction, or insurance policy 223. In some embodiments, the questionnaire may include a list of yes/no questions regarding whether a specific security control 225 relevant to the cyber-risks covered by an insurance policy 223 is implemented. If the insurance consumer responds in the affirmative (e.g., "yes"), the insurance consumer may pick from a list of possible software/hardware controls, or specify something else (e.g., "other") and the name of the process and what host it runs on (e.g., with a host identifier such as an IP address, hostname, etc.).

The security control server 100 may then receive responses to the questionnaire that are transmitted from the insurance consumer device 105 via network 110 to network interface 210. When all required questions relevant to a cyber-liability insurance transaction have been responded to, the questionnaire may be submitted from the client device 105 over network 110 to security control server 100, which queues the processor to generate DL axioms from the insurance consumer user responses using the reasoning engine 230. The generated DL axioms may then persist in knowledgebase 220 as an insurance policy 223.

In some embodiments, the reasoning engine 230 may use the questionnaire responses and the insurance policy 223 and security controls 225 from the knowledgebase 220 to determine the cyber threats and cyber vulnerabilities relevant to the policy 223 that are and are not mitigated via one or more security controls 225. In other embodiments, the security control server 100 may scan covered devices or servers to discover operational processes that match specific attributes, such as process name and the port being monitored, in order to determine the cyber threats and cyber vulnerabilities relevant to the policy 223 that are and are not mitigated via one or more security controls 225. In other embodiments, the security control server 100 may provide a user interface for display on client 105 that allows a user to input specific controls that were potentially not addressed in the questionnaire and/or were not discoverable by the security control server 100. Thus, the knowledgebase 220 may contain the axioms representing the unique agreement or policy 223 between the insurance provider and the insurance consumer and the responses by the insurance consumer about security controls 225 in their cyber operational environment that mitigate the risks relevant to the cyber threats and vulnerabilities, or cyber risks, specified as relevant to the policy.

Once the insurance policy 223 has been defined and stored in knowledgebase 220, the reasoning engine 230 may then generate a list 233 of the mitigated and non-mitigated cyber-risks, such as cyber threats and cyber vulnerabilities, associated with an insurance transaction. For example, the reasoning engine 230 may access the knowledgebase 220, and retrieve the DL axioms of insurance policy 223 to generate a list 233 of the cyber threats and vulnerabilities mitigated and not mitigated by the insurance consumer's security controls 225. In some embodiments, the list of mitigated and non-mitigated cyber-risks 233 may be based solely on the user input, whether entered directly as DL axioms into knowledgebase 220 or submitted as responses to the questions generated by the questionnaire module 231.

The list 233 of the mitigated and non-mitigated cyber-risks may be generated in, for example, HTML format and delivered to one or more client devices 105 (e.g., insurance provider and/or insurance consumer) over network 110 via the network interface 210 using a protocol such as HTTP/HTTPS. In some embodiments, the list 233 of mitigated and non-mitigated cyber-risks may be disjoint sets, meaning that a specific risk may only be either mitigated or non-mitigated. The insurance provider and/or insurance consumer may then review the list 233 of the mitigated and non-mitigated cyber-risks, e.g., to evaluate accuracy, compliance with the insurance policy 223, and for other reasons. In some embodiments, the insurance provider and/or insurance consumer may optionally take some action, such as, for example, changing policy premiums to account for a higher or lower risk level than originally estimated, adding new security controls to mitigate additional threats, and other actions. The generation of the list 233 of the mitigated and non-mitigated cyber risks is further described below in connection with FIG. 4.

In some embodiments, the reasoning engine 230 of security control server 100 may further generate a ranked list of recommended security controls 237 for each of the non-mitigated risks in the list 233 using a security control ranking module 235. The security control server may transmit the ranked list of recommended security controls 237 generated by the security control ranking module 235 to an insurance consumer and/or insurance provider client device 105. In some embodiments, the insurance consumer may review the ranked list of recommended security controls 237 on a graphical user interface on a client device 105, and may choose to take some action, such as acquiring and implementing a recommended security control. The process for ranking one or more recommended security controls is described in further detail below in connection with FIGS. 5A-C.

In some embodiments, the security control server 100 may include an external monitoring engine 240. The external monitoring engine 240 may include an external monitoring configuration 241 for an external monitoring agent on an insured device 115 to monitor each security control. The monitoring configuration 241 may include one or more axioms 221 specific to a given policy 225 from the knowledgebase 220 that specify security controls 225 that should be implemented on an insured device 115. In particular, the monitoring engine 230 may retrieve the policy axioms 225 from the knowledgebase 220, and for each axiom representing a software-enabled security control 225, the monitoring engine 230 may generate an entry for an external monitoring configuration 241. For example, each policy axiom associated with a security control 225 may contain, e.g., the name(s) of the process(es) that implement the security control, a port number that the control listens to, a host identifier (e.g., an IP address or hostname that is valid addressable hostname), and the alert mechanism that a monitoring agent should use to notify the security control server 100. The external monitoring configuration 241 may be transmitted by the external monitoring engine 240 via the network interface 210 to an insured device 115 that contains a monitoring agent and one or more software-enabled security controls for the purpose of providing external process monitoring. The monitoring engine 240 may further receive alerts associated with one or more security controls from one or more monitoring agents executing on one or more insured devices 115, as described in further detail below.

In some embodiments, the monitoring engine 240 may produce an evaluation report, or scorecard, which assesses the cyber threats and risks of an enterprise system(s) based on the monitoring of security controls implemented to counter those threats and the vulnerabilities that implement the threats. The monitoring engine 240 may monitor the implemented security control(s) 225 associated with an insurance policy 223 to ensure that the security control(s) remain operational, and provide alerts to a client device 105 should a security control's operational status, performance, or other aspect change, such that the evaluation report's "score" changes. The process for monitoring one or more insured devices 115 is described below in connection with FIGS. 6A-C. It will be appreciated that a security control server 100 according to embodiments of the present invention may include both a security control ranking module 235 and a monitoring engine 240, or the security control server 100 may include only one of a security ranking module 235 and a monitoring engine 240.

Figure 3:
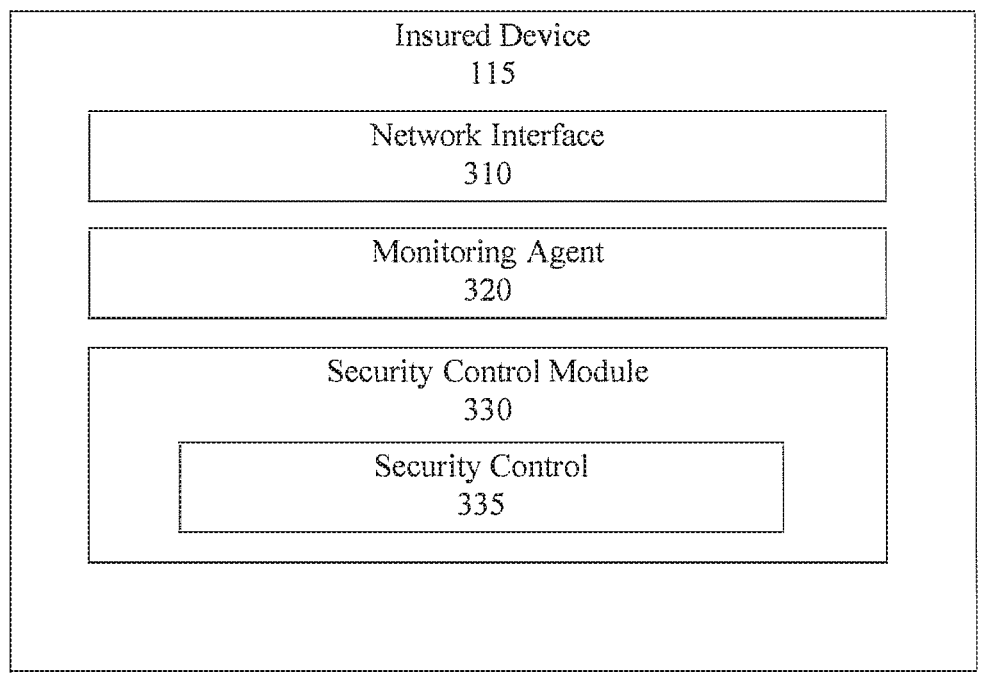
FIG. 3 is a block diagram showing logical components of an insured device, according to some embodiments of the present invention.

FIG. 3 is a block diagram of the logical components of an insured device 115, according to some embodiments of the present invention. Insured device 115 may include one or more network interfaces 310, a monitoring agent 320, and one or more security control modules 330.

The network interface 310 may enable the insured device 115 to electronically communicate with devices attached to a network 110. For example, the insured device 115 may include a processor that is configured to use a network interface 310 to exchange one or more messages or information to the security control server 100, as well as users, or clients 105, via a network 110. In some embodiments, a delivery protocol may be used by the insured device 115 for transmitting such messages over network 110, such as, for example, the Internet Protocol (IP), Hypertext Transfer Protocol (HTTP), Secure HTTP (HTTPS), or an email protocol such as Simple Mail Transfer Protocol (SMTP), Post Office Protocol (POP), Messaging Application Programming Interface (MAPI), the Internet Message Access Protocol (IMAP), etc.

The monitoring agent 320 of the insured device 115 may monitor the software-enabled security control 335 in accordance with an external monitoring configuration 241. If the security control 335 fails to be operational, the monitoring agent 320 may generate an alert. The insured device 115 may employ the network interface 310 to transmit the alert to the monitoring engine 240 of security control server 100 via the network interface 210. Several possible implementations of monitoring agents 320 may be used to monitor system processes. In some instances, the monitoring agents 320 may belong to a third party (e.g., other than the insurance company or the insurance customer) and/or may already be used in an enterprise suite. In some instances, a monitoring agent 320 may be provided by security control server 100, such as an open source monitoring agent 320.

In some embodiments, the monitoring agent 320 may alert both a third-party provider and an insurance consumer if an alert is relevant to an insurance policy, or if there is not backup or alternate control that may cover the risk sufficiently and is still operational. The alert mechanism may be implemented as simple network management protocol, short message service, simple mail transfer protocol, extensible messaging and presence protocol, session initiation protocol for instant messaging and presence leveraging extensions, or other messaging, mail or network management protocol.

The security control module 330 may contain one or more software enabled security controls 335 that an insurance customer implements to mitigate the risk associated with cyber threats and vulnerabilities. In some embodiments, the software-enabled security control 335 may also include devices, such as a firewall. The security control module 330 may configure one or more security controls 335 for insured device 115 in accordance with external monitoring configuration data 241 transmitted from a security control server 100. Additionally, the monitoring engine 320 may monitor the security controls 335 in accordance with external monitoring configuration data 241 transmitted from a security control server 100. The monitoring may be performed continuously to ensure that each security control 335 is in operation in accordance with a specific insurance policy.

Figure 4:
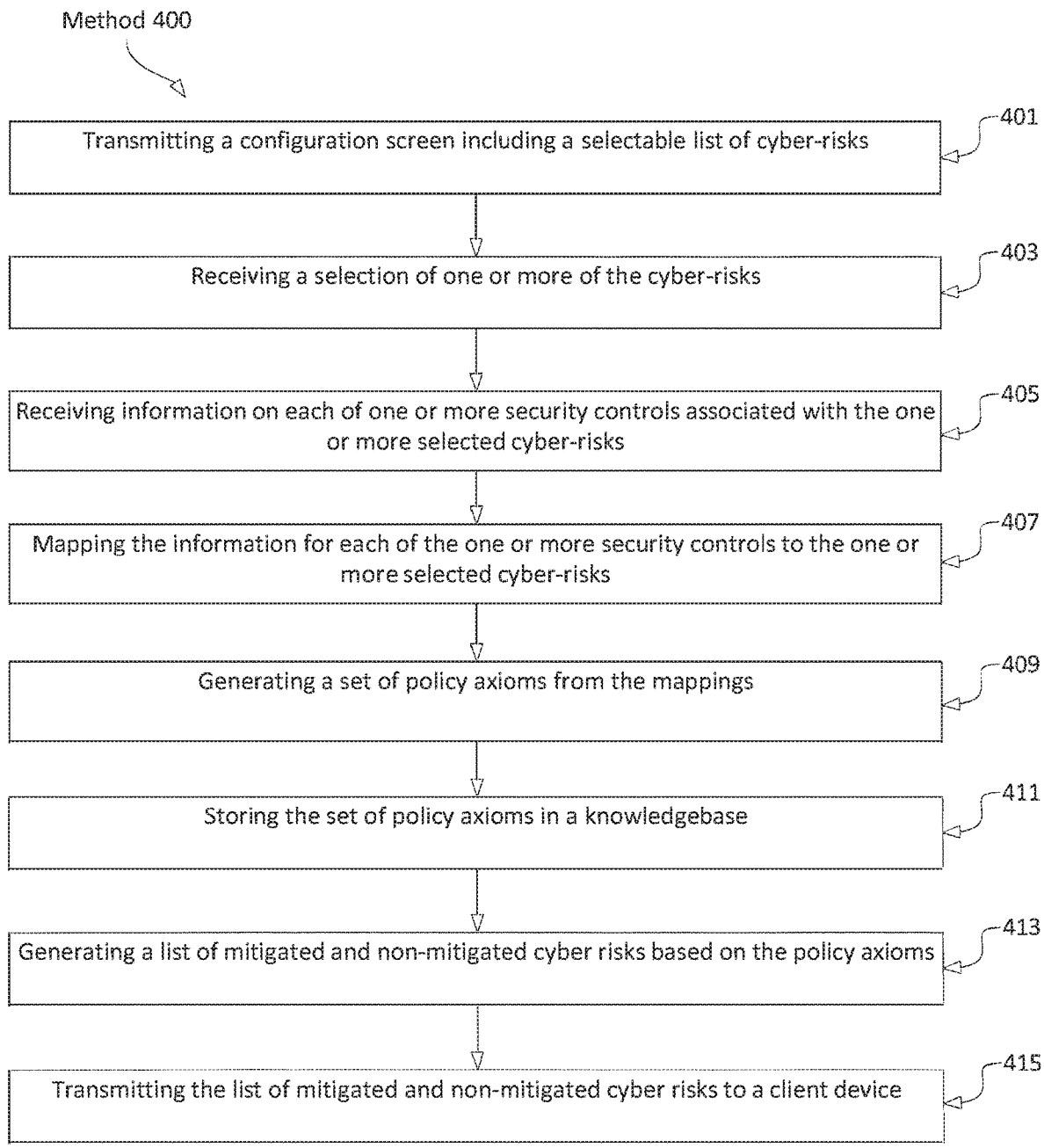
FIG. 4 is a flow diagram illustrating a method for assessing risk associated with a cyber-liability insurance transaction according to some embodiments of the present invention.

FIG. 4 is a flow diagram of a method 400 for assessing risk associated with a cyber-liability insurance transaction. In some embodiments, method 400 may be performed by security control server 100.

Figure 8B:
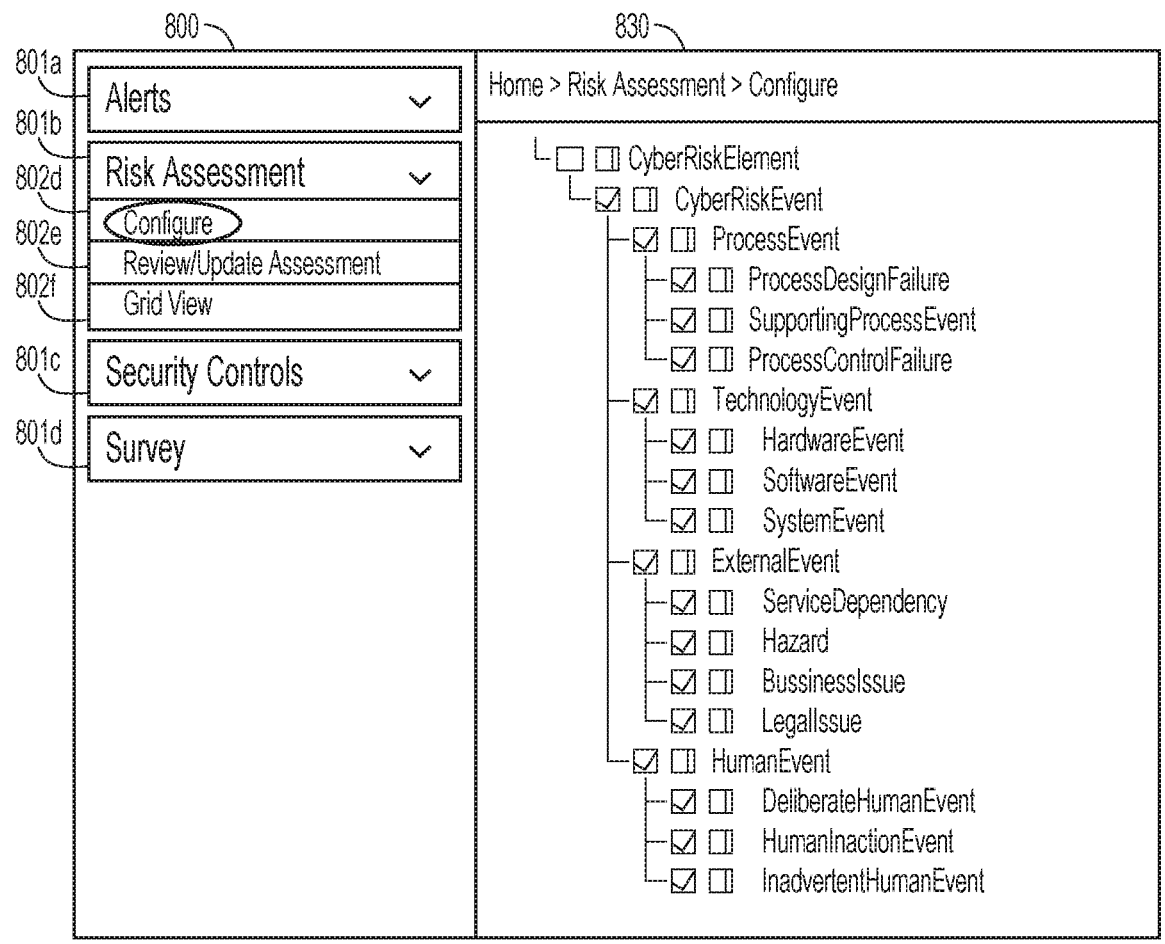
FIG. 8B is an illustrative workspace display depicting a risk assessment configuration screen, according to some embodiments of the present invention.

Method 400 includes step 401 of transmitting a configuration screen including a selectable list of cyber-risks. According to some embodiments, the security control server 100 may access the general axioms 221 from the knowledgebase 220 associated with cyber-threats, cyber-vulnerabilities, and/or cyber-risks, and generate a configuration screen listing those axioms. The configuration screen may present the general axioms 221 in the form of a user-selectable list that may be presented in a graphical display on client device 105. The user may then select one or more of the general axioms 221 displayed in the configuration screen to be included as covered risks associated with a cyber-insurance policy transaction. An example configuration screen is depicted in FIG. 8B, described below.

Method 400 further includes step 403 of receiving a selection of one or more of the cyber-risks. According to some embodiments, the security control server 100 may receive a response from the client device 105 indicating that the user has selected one or more of the general axioms 221 to be included as a covered risk relevant to a cyber-liability insurance transaction. As described above, one or more security controls may be associated with, or mapped to, each cyber-risk, vulnerability, and/or threat, e.g., via one or more role axioms. Once the security control server 100 receives the selection of one or more cyber-risks related to an insurance transaction, or insurance policy, the security control server 100 may then prompt the user or client device 105 for information regarding each of the associated security controls so that all parties may assess the risk being transferred to the insurer.

Method 400 further includes step 405 of receiving information on each of one or more security controls associated with the one or more selected cyber-risks. This information may include an indication of whether the security control has been implemented on an insured device or has not been implemented on the insured device. As described above, the security control server 100 may obtain information regarding security controls in a variety of ways. For example, a user skilled in the art of DLL axiom generation may simply enter information regarding the implemented security controls and submit that information to the security control server 100. In other embodiments, security control server 100 may employ the reasoning engine 230 to automatically generate a questionnaire to submit to the user device 105 regarding the implemented security controls on the covered or insured device 115. In such embodiments, the security control server 100 may then transform the questionnaire responses into individual DLL axioms.

Method 400 further includes step 407 of mapping the information for each of the one or more security controls to the one or more selected cyber-risks. In some embodiments, security control server 100 may perform the mapping by employing the reasoning engine 230 to access the one or more generic role axioms 221 in knowledgebase 220 that map security controls to cyber vulnerabilities, cyber threats and/or cyber risks and use those generic role axioms 221 to map the information for each of the security controls to the one or more selected cyber-risks.

Method 400 further includes step 409 of generating a set of policy axioms from the mappings. In preferred embodiments, the cyber-insurance transaction or policy 223 is represented as the set of policy axioms with associated security controls 225.

Method 400 further includes step 411 of storing the set of policy axioms in a knowledgebase. For example, the security control server 100 may store the policy axioms as an insurance policy 223 with associated security controls 225 in knowledgebase 220.

Method 400 further includes step 413 of generating a list of mitigated and non-mitigated cyber risks based on the policy axioms. The list 233 of mitigated and non-mitigated cyber-risks may be generated by the reasoning engine 230 of the security control server 100. For example, the reasoning engine 230 may access the insurance policy 223 in knowledgebase 220 and use the information on the implemented and non-implemented security controls 225 (e.g., user responses to the questionnaire) to determine a list of mitigated and non-mitigated cyber-risks. The list 233 of mitigated and non-mitigated cyber-risks may be generated in a format (e.g., HTML or a document format) that may be delivered electronically to one or more client devices 105.

Method 400 further includes step 415 of transmitting the list of mitigated and non-mitigated cyber risks to a client device 105. In turn, an insurance provider and/or insurance consumer operating client device 105 may review the list of mitigated and non-mitigated risks, e.g., to assess transferred risk, to evaluate accuracy, to assess compliance with the insurance policy 223, and for other reasons.

Figure 5A:
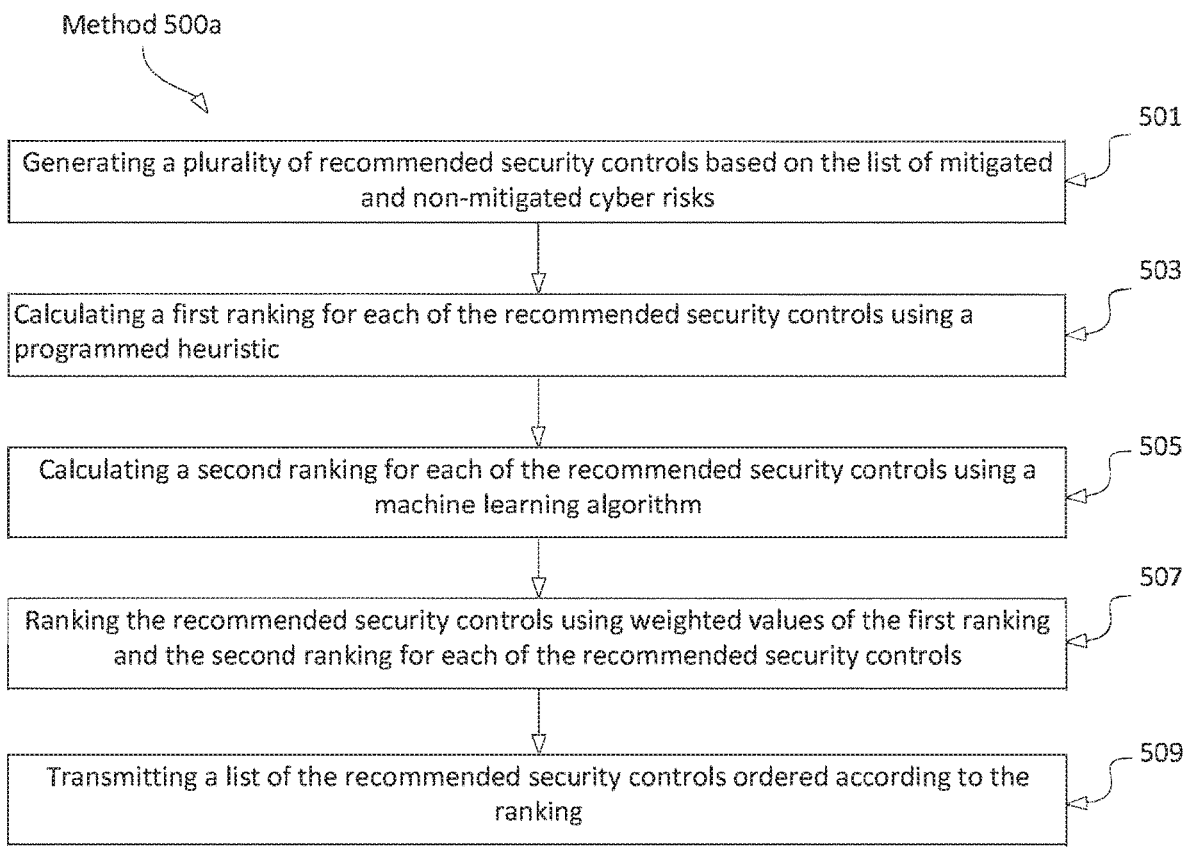
FIG. 5A is a flow diagram illustrating a method for recommending security controls relevant to a cyber-liability insurance transaction according to some embodiments of the present invention.

FIG. 5A is a flow diagram of a method for recommending security controls relevant to a cyber-liability insurance transaction. In some embodiments, after generating or obtaining a list of mitigated and non-mitigated cyber-risks, the security control server 100 may use the insurance policy 223 and the knowledgebase 220 to generate a ranked list of security controls 237 the insured organization can implement specific to one or more insured IT assets to enhance the security posture of those systems and reduce the risks associated with the cyber liability insurance policy.

In some embodiments, method 500a is performed by security control server 100. Method 500a may include step 501, which includes generating a plurality of recommended security controls based on the list of mitigated and non-mitigated cyber risks. The recommended security controls may enhance the security posture of one or more insured devices with respect to one or more cyber-risks specified in a cyber-insurance transaction or policy. In some embodiments, the proposed security controls can be relevant to all insured IT assets holistically, or specific IT assets. In some embodiments, the proposed security controls can be relevant to all non-mitigated risks from the list of mitigated and non-mitigated cyber-risks 233 holistically, or specific to certain non-mitigated risks.

Method 500a may include step 503, which includes calculating a first ranking for each of the recommended security controls using a programmed heuristic. In some embodiments, the heuristic may use one or more of the following attributes: i) an available budget for investing in security controls to mitigate risk; ii) cost factor for implementing specific controls; iii) the list of non-mitigated risks, either by IT asset or holistically for the enterprise; iv) a list of threats that affect those risks; v) a list of vulnerabilities that instantiate those threats; vi) a list of security controls that control the vulnerabilities and lessen the threat level of occurrence; vii) an intrinsic value for specific security controls (this intrinsic value could be based on requirements for compliance with regulations, corporate policy, or other factor beyond the value of the specific use—reducing risks associated with the transaction); viii) The costs associated with IT assets being unavailable (this is typically computed for determining the policy coverages specified in the transaction); ix) the costs specified in the transaction, if any, for the realization of a specific threat on a specific IT asset(s) or the enterprise holistically (this would also be stated in the policy, if any. For example, if a company had a third party data loss policy for $20M covering three specific systems, this policy factor specifies the risks and the IT assets). In some embodiments, the user may specify their importance of the above attributes. For example, if the client has a "hard" budget number, they can assign a higher ranking to the cost factor. Alternatively, if the client has additional funding beyond their budget, they may assign a lower ranking to the cost factor. The combination of the one or more attributes must have an aggregate ranking of 100%. In some embodiments, the budget, or cost factor, may be ranked the highest by default where the budget is the largest constraining factor.

In some embodiments, the security control server 100 may employ the security control ranking module 235 to use the heuristic to compute the cost advantage (cost reduction as specified in the policy) associated with each of the security controls by summing each calculated cost advantage associated with that control for each non-mitigated risk for which it provides coverage. The heuristic may add the intrinsic value, if any, for the control into this cost advantage. In some embodiments, the security control ranking module 235 may further use the heuristic to sort the security controls based on the highest cost advantage.

In some embodiments, the security control ranking module 235 may further use the heuristic to compare, e.g., in highest to lowest order based on cost advantage ranking, each security control's cost of implementation to the budget in order to determine: i) if the security control can be implemented based on the budget; ii) the security control can be implemented based on the budget plus a configurable percentage factor of the budget; and/or iii) what remaining budget enables other controls to be implemented. For example, the security control ranking module 235 may sum the cost advantage computed for all controls that can be implemented with the budget in highest to lowest order based on the ranking. Additionally, the security control ranking module 235 may determine the best set of controls (the combination of controls with the highest cost advantage whose total cost is within the budget) for the specified security control.

In some embodiments, the security control ranking module 235 may sort the security controls, using the heuristic, including subsequent combined security controls, if any, based on the total (including combined) cost advantage from highest to lowest order.

Method 500a may further include step 505, which includes calculating a second ranking for each of the recommended security controls using a machine learning algorithm. In some embodiments, the security control server 100 may employ the security control ranking module 235 of reasoning engine 230 to create a training set of historical cyber liability transactions of similar coverages and rules. This training set may highlight the cyber-insurance policy premium amount based on the coverages and the security controls implemented by the insured with the resulting list of mitigated and non-mitigated risks. The machine learning algorithm may use the median cost of implementing the control for all occurrences in the training set where the control was implemented.

In some embodiments, the machine learning algorithm may include a standard multivariate linear regression cost function as specified below for each control cost as the feature and the premium as the outcome:

$$J(\Theta) = \frac{1}{2m} + \sum_{i=1}^{m} (h_\Theta(x^{(i)}) - y^{(i)})^2,$$

$$h_\Theta(x^{(i)}) = \sum_{j=0}^{n} \Theta_j x_j^{(i)} = \Theta^T x^{(i)}$$

$h_\Theta(x^{(i)})$=predicted value of $y^{(i)}$(h=hypothesis)
$x^{(i)}$=n-dimensional feature vector in training set example
$x_j^{(i)}$=value of feature j in the vector
$\Theta^T x^{(i)}$=vector multiplication of the transposed theta set with the feature set i
i=data point index
m=number of data points
j=feature index
n=number of features
x=feature In some embodiments, the machine learning algorithm may include a gradient descent as shown below to find the minimum value of the cost function.

$$\Theta_j := \Theta_j - \alpha \frac{\delta}{\delta \Theta_j} J(\Theta),$$

$$\frac{\delta}{\delta \Theta_j} J(\Theta) = \frac{1}{m} \sum_{i=1}^{m} (h_\Theta(x^{(i)}) - y^{(i)}) x_j^{(i)}$$

In some embodiments, the machine learning algorithm may include listing the combination of controls implemented for similar policies that have the lowest premiums, and based on the controls currently implemented for the specific transaction, determines the next best set of controls that can be implemented to reduce the transaction premium. This result may be filtered to remove combinations that exceed the budget plus some configurable percentage of the budget.

Method 500a may further include step 507, which includes ranking the recommended security controls using weighted values of the first ranking and the second ranking for each of the recommended security controls. The weighted values, or combination weight, may be integers between 0 and 100 that is assigned to both the heuristic ranking performed in step 503 and the machine learning algorithm ranking performed in step 505. When assigned, the two integers total 100, and the combination weight may represent the percentage that the insurer and the insured trust the output of the heuristic ranking and the machine learning algorithm ranking. For example, if a weight value of 100 is assigned to the heuristic, then a weight value of 0 is assigned to the machine learning algorithm, and this represents that the insurer and insured only trust the heuristic, and want to use 100% of its findings.

In some embodiments, point values may be assigned by a computer to a configurable top X (example, 10) security control recommendations list from each of the heuristic and the algorithm rankings, and points (from value of configurable X variable to the integer 1) in order of recommendation. For example, if X is 10, then the integer 10 is assigned as the point value for each of the top recommendations from the heuristic and the algorithm; 9 is assigned to the #2 top recommendation; and so forth until the integer 1 is assigned as the top #10 recommendation from each heuristic and algorithm. In some embodiments, the security control ranking module 235 of security control server 100 may multiply the point values by the percentage assigned by the combination weight. The resulting values may be summed for each security control in the ranked lists from the heuristic and the machine learning algorithm, and the totals sorted from highest to lowest.

For example, if security control A is listed in both the heuristic ranked list (as #1) and the machine learning algorithm ranked list (as #10), and the combination weight is 50 for each the heuristic and the algorithm, and security control B is listed as #4 on both the heuristic and the algorithm ranked lists, then security control B's total score of 7 (i.e., 7 [points scored from heuristic #4 rank]*50%+7 [points scored from algorithm]*50%) is higher than security control A's score of 5 (10 [points scored from heuristic #1 rank] *50%+1 [points scored from algorithm] *50%), so security control B is ranked higher than security control A, even though security control A had a higher individual rank than either of security control B's individual rankings.

Method 500a may further include step 509, which includes transmitting a list of the recommended security controls ordered according to the ranking. Thus, in some embodiments, the ranked overall list may be transmitted by the security control server 100 via network interface 210 to the insurer and/or insured client device 105, such that the insured can implement the recommended control(s) to reduce the risks associated with the transaction, and, thereby reduce the premium.

Figure 5B:
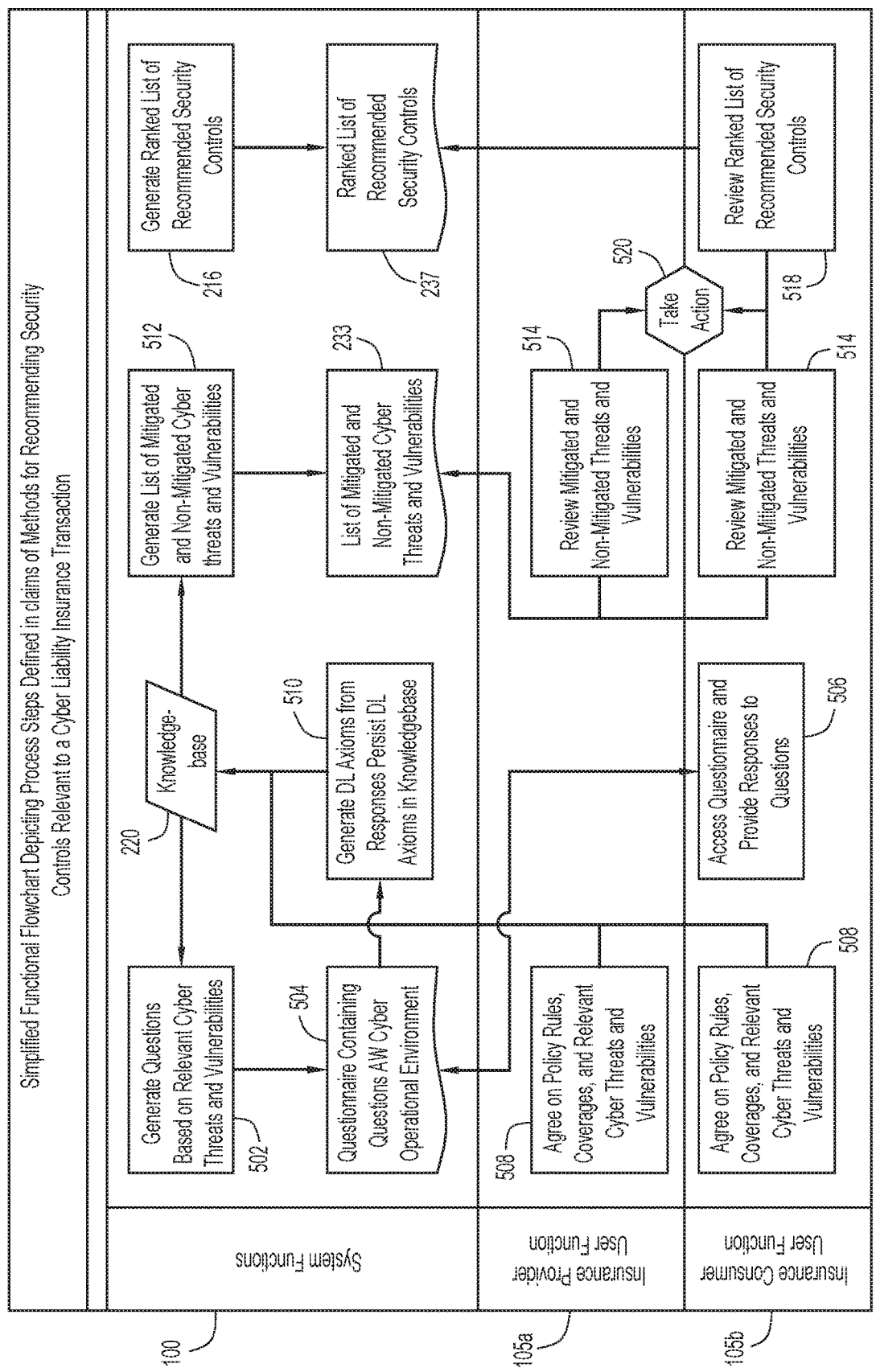
FIG. 5B is a functional flow diagram illustrating a method for recommending security controls relevant to a cyber-liability insurance transaction, according to some embodiments of the present invention.

FIG. 5B is a functional flow diagram illustrating a method for recommending security controls relevant to a cyber-liability insurance transaction, according to some embodiments. FIG. 5B depicts functions that may be performed by security control server 100 and multiple client devices 105 (e.g., device(s) operated by insurance provider 105a and device(s) operated by insurance consumer 105b), which may correspond to an insurance provider and an insurance provider. At 502, the security control server 100 generates questions based on relevant cyber threats and vulnerabilities. As explained above, the reasoning engine 230 in the security control server 100 may generate the questions. The security control server 100 then generates a questionnaire 504 containing questions about a cyber operational environment. In some embodiments, the questionnaire module 231 in security control server 100 may generate the questionnaire 504. In 506, the insurance consumer 105b may access the questionnaire 504 generated by the security control server 100 and provide responses to the questions. In 508, the insurance consumer 105b and the insurance provider 105a may then agree on policy rules, coverages, and relevant cyber threats and vulnerabilities relevant to a cyber liability insurance transaction.

In 510, the security control server 100 may generate DL axioms based on the responses to the questionnaire and persist those DL axioms in knowledgebase 220 from the insurance consumer 105b. In 512, the security control server 100 may generate a list of mitigated and non-mitigated cyber threats and vulnerabilities 233. In 514, the insurance provider 105a and insurance consumer 105b may review the list of mitigated and non-mitigated cyber threats and vulnerabilities. The list of mitigated and non-mitigated cyber threats and vulnerabilities 233.

In 516, the security control server 100 may generate a ranked list of recommended security controls 237. In some embodiments, the security control server 100 generates the ranked list of recommended security controls 237 using the security control ranking module 235. In 518, the insurance customer 105b may review the ranked list of recommended security controls 518. In 520, one or more of the insurance customer 105b and/or the insurance provider 105a may take action based on the list of mitigated and non-mitigated cyber threats and vulnerabilities 233 and the ranked list of recommended security controls 237. For example, the insurance provider may require that the insurance customer implement one or more of the recommended security controls, or the insurance customer may decide to implement one or more of the recommended security controls.

Figure 5C:
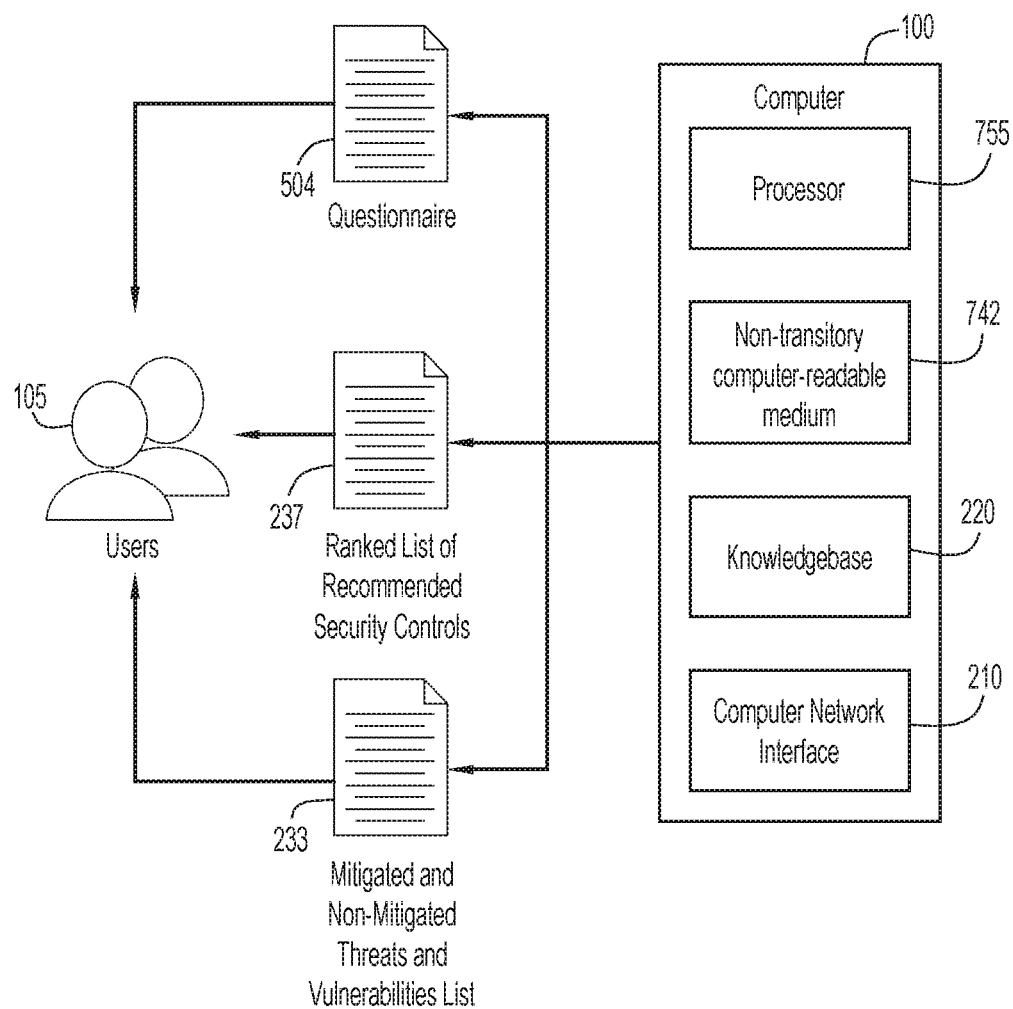
FIG. 5C is a block diagram illustrating a system for recommending security controls relevant to a cyber-liability insurance transaction, according to some embodiments of the present invention.

FIG. 5C is a block diagram illustrating a system for recommending security controls relevant to a cyber-liability insurance transaction, according to some embodiments. FIG. 5C depicts a security control server 100, which may comprise or be electronically coupled with a processor 755 and non-transitory computer-readable medium 742, described below in connection with FIG. 7, as well as knowledgebase 220 and a computer network interface 210. The security control server 100 may transmit one or more of the mitigated and non-mitigated threats and vulnerabilities list 233, the ranked list of recommended security controls 237, and/or the questionnaire 504 to users 105, which may include an insurance provider and/or an insurance customer.

Figure 6A:
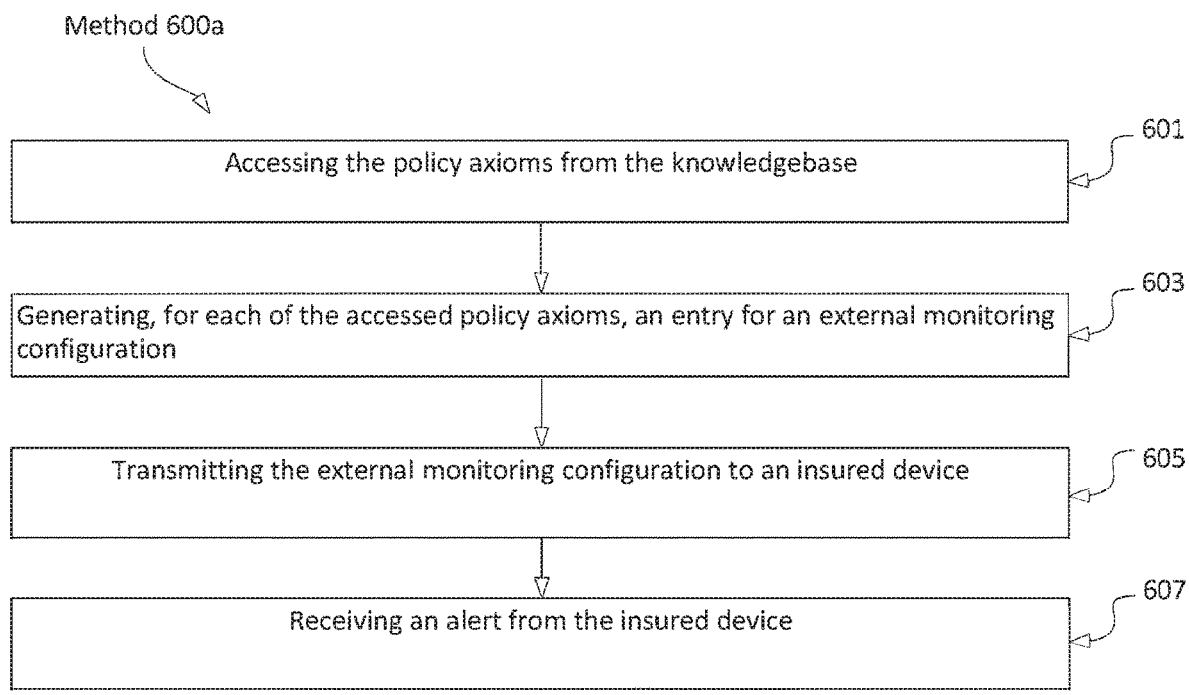
FIG. 6A is a flow diagram illustrating a method for monitoring security controls relevant to a cyber-liability insurance transaction according to some embodiments of the present invention.

FIG. 6A is a flow diagram of a method for monitoring security controls relevant to a cyber-liability insurance transaction. The term "situational awareness" may refer to possessing knowledge of the relevant cyber threats and vulnerabilities applicable to the cyber liability insurance transaction, as well as the security controls implemented to mitigate the risks associated with the threats and vulnerabilities. The cyber threats and vulnerabilities may change depending on whether a security control is operational or not. In some embodiments, method 600a may be performed by a security control server 100. In some embodiments, method 600a may be performed by the monitoring engine 240 of the security control server 100.

Method 600a may include step 601, which includes accessing the policy axioms from the knowledgebase. As described above, the policy axioms may define an insurance policy 223 with associated security controls 225. The insurance policy 223 may be stored in knowledgebase 220 of security control server 100.

Method 600a may include step 603, which includes generating, for each of the accessed policy axioms, an entry for an external monitoring configuration. As explained above, the external monitoring engine 240 of security control server 100 may include an external monitoring configuration 241 for an external monitoring agent on an insured device 115 to monitor each security control. The monitoring configuration 241 may include one or more axioms 221 specific to a given policy 225 from the knowledgebase 220 that specify security controls 225 that should be implemented on an insured device 115. The external monitoring configuration 241 may include, for example, the name(s) of the process(es) that implement the security control, a host identifier (e.g., an IP address or hostname that is valid addressable hostname), and an alert mechanism that a monitoring agent should use to notify the security control server 100 if the security control fails. The screens used for generating the external monitoring configuration, including configuring the alerts and external monitoring deployments are depicted in FIGS. 8A and 8F, described below.

Method 600a may include step 605, which includes transmitting the external monitoring configuration to an insured device. For example, the external monitoring engine 240 of security control server 100 may electronically transmit the monitoring configuration 241 via network interface 210 to an insured device 115. As described above in connection with FIG. 3, the insured device 115 may receive the monitoring configuration 241 via network interface 310, and the monitoring agent 320 and/or security control module 330 on insured device 115 may monitor the security control(s) 335 in accordance with the configuration 241. If the security control 335 fails to be operational, the monitoring agent 320 may generate an alert in accordance with the monitoring configuration 241.

Method 600a may include step 607, which includes receiving an alert from the insured device. In some embodiments, the alert indicates that one or more security controls for one or more of the mitigated risks fails to be operational. For example, the monitoring agent 320 of an insured device 115 may generate an alert if it is relevant to a policy and/or if there is no backup or alternate control that may cover the cyber-risk sufficiently and is still operational. In some embodiments, the security control server 100 may access the knowledgebase 220 to determine if the alert is required to be forwarded to a client device 105, such as the insurance customer and/or the insurance provider. If the security control server 100 determines that the alert is required to be forwarded, the security control server 100 may transmit or forward the alert to one or more client devices 105 via network interface 210. Thus, a user, such as an insurance provider or insurance consumer, may review the alert, e.g., for policy compliance, and optionally take any appropriate action(s).

The alert mechanism may be implemented as simple network management protocol, short message service, simple mail transfer protocol, extensible messaging and presence protocol, session initiation protocol for instant messaging and presence leveraging extensions, or other messaging, mail or network management protocol. When the security control server 100 receives alerts from monitoring agent(s) on an insured device 115, it must determine if the absence of the control effects the risk; that is, if the control is not operational, but a backup control exists, and the backup is operational, then the vulnerability is still addressed; therefore, the threat and the accompanying risks are not created by the control not being operational. If the risk exists, then the security control server 100 must notify the consumer and provider via an alerting mechanism, which could be implemented using simple network management protocol, short message service, simple mail transfer protocol, extensible messaging and presence protocol, session initiation protocol for instant messaging and presence leveraging extensions, or other messaging, mail or network management protocol. In some embodiments, the client device 105 may be a smart phone or tablet as described above, and the alerts may be delivered via text message, as a SNMP trap, or over the internet as a PDF, an HTML form, or a text-based email message.

Figure 6B:
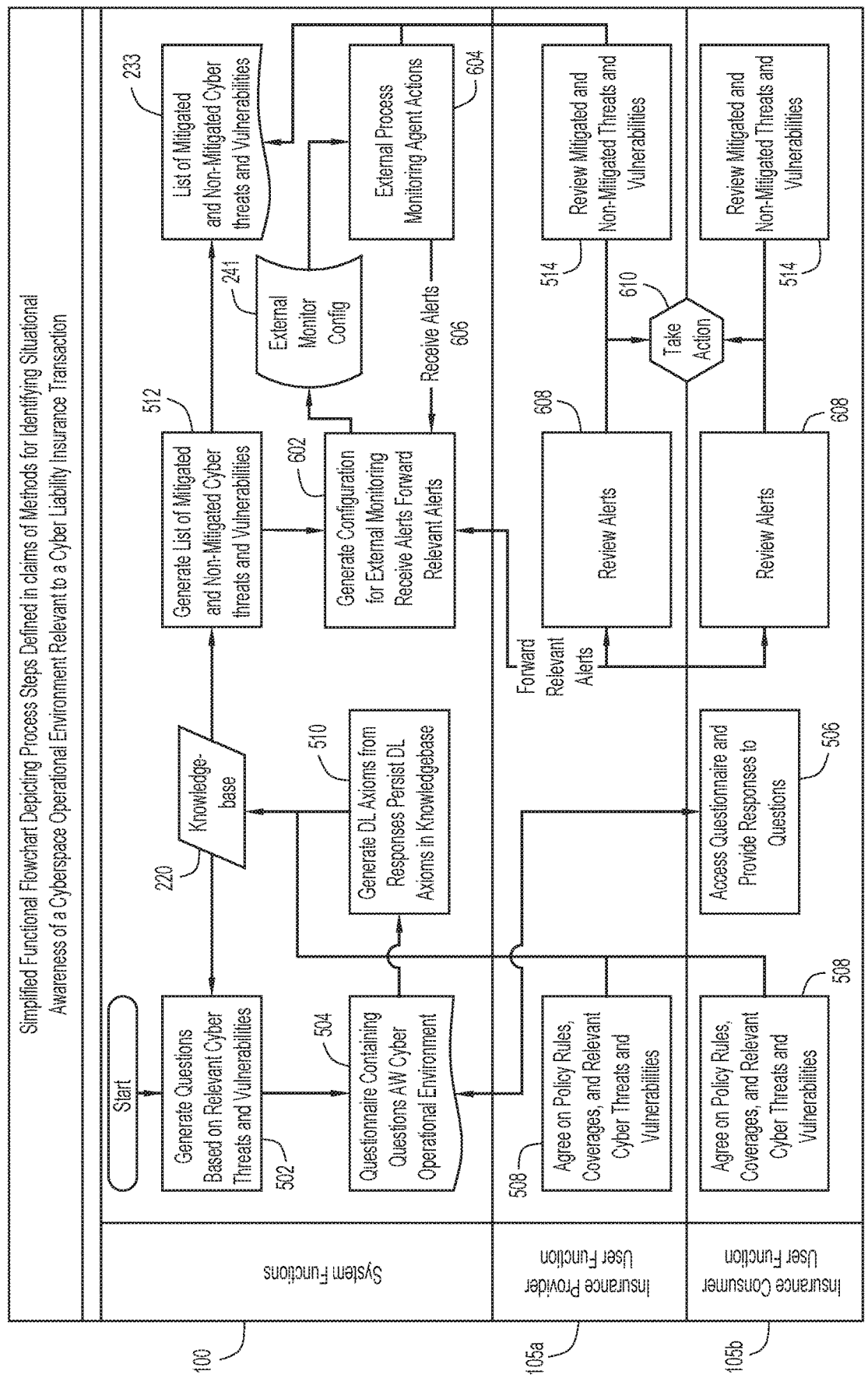
FIG. 6B is a functional flow diagram illustrating a method for identifying situational awareness of a cyberspace operational environment relevant to a cyber liability insurance transaction, according to some embodiments of the present invention.

FIG. 6B is a functional flow diagram illustrating a method for identifying situational awareness of a cyberspace operational environment relevant to a cyber liability insurance transaction, according to some embodiments. The method may comprise functions performed by one or more of a security control server 100, an insurance provider 105a, and an insurance consumer 105b. Elements 502, 504, 506, 508, 510, 220, 512, and 514 have been described above in connection with FIG. 5B.

Element 602 includes the security control server 100 generating configuration data for external monitoring 241 and receiving/forwarding relevant alerts. In some embodiments, the external monitoring configuration data 241 is generated by the monitoring engine 240 of security control server 100, which also receives, processes, and/or forwards alerts to a client device 105. In 604, an external monitoring process occurs. For example, the external process may include monitoring agent actions executed by one or more monitoring agents 320 on one or more insured devices 115. As described above, the monitoring agents 320 may generate and transmit one or more alerts 606 to security control server 100.

In some embodiments, the security control sever may transmit one or more received alerts 606 to one or more client devices 105, which may include the insurance provider 105a and the insurance consumer 105b. In 608, the insurance provider 105a and/or the insurance customer 105b may review the alerts. In 610, the insurance provider 105a and/or the insurance customer 105b may take an action in response to the alerts 606 and/or the list of mitigated and non-mitigated threats and vulnerabilities 233. For example, actions may include one or more of: repairing a security control to address an alert, implementing a new security control, and/or taking one or more actions to mitigate a threat or risk associated with an alert.

Figure 6C:
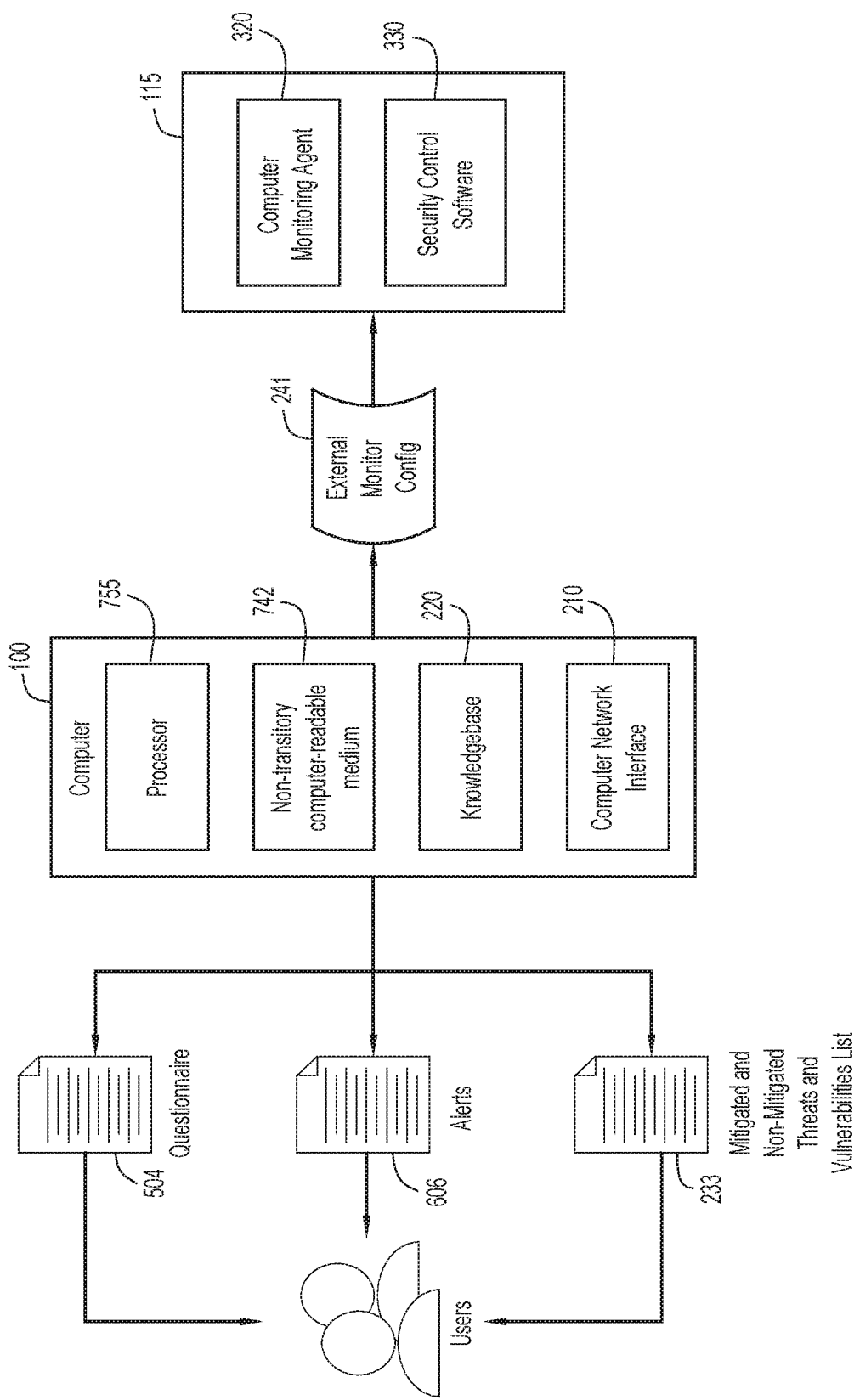
FIG. 6C is a block diagram illustrating a system for identifying situational awareness of a cyberspace operational environment relevant to a cyber liability insurance transaction, according to some embodiments of the present invention.

FIG. 6C is a block diagram illustrating a system for identifying situational awareness of a cyberspace operational environment relevant to a cyber liability insurance transaction, according to some embodiments. FIG. 6C depicts a security control server 100, which may comprise or be electronically coupled with a processor 755 and non-transitory computer-readable medium 742, described below in connection with FIG. 7, as well as knowledgebase 220 and a computer network interface 210. The security control server 100 may transmit one or more of the questionnaire 504, the alerts 606, and the list of mitigated and non-mitigated threats and vulnerabilities list 233 to users 105, which may include an insurance provider and/or an insurance customer. Additionally, the security control server 100 may transmit external monitoring configuration data 241 to an insured device 115. The insured device 115 may comprise a monitoring agent 320 and security control software 330, e.g., as described above in connection with FIG. 3.

FIG. 7 is a schematic diagram of a security control apparatus, such as security control server 100, according to embodiments of the present invention. As shown in FIG. 7, apparatus 100 may include or consist of: a computer system (CS) 702, which may include one or more processors 755 (e.g., a microprocessor) and/or one or more circuits, such as an application specific integrated circuit (ASIC), field-programmable gate arrays (FPGAs), a logic circuit, and the like; a network interface 210, which may include a communications port 706 configured to receive and/or transmit communication data, instructions, and/or messages from a network, such as network 110; and a data storage system 708, which may include one or more non-volatile storage devices and/or one or more volatile storage devices (e.g., random access memory (RAM)).

In embodiments where apparatus 100 includes a processor 755, a computer program product or computer readable medium (CRM) 742 storing a computer program (CP) 743 comprising computer readable instructions for performing steps described herein (e.g., one or more of the steps shown in FIGS. 4-6). CP 743 may include an operating system (OS) and/or application programs. CRM 742 may include a non-transitory computer readable medium, such as, but not limited to, magnetic media (e.g., a hard disk), optical media (e.g., a DVD), solid state devices (e.g., random access memory (RAM), flash memory), and the like.

In some embodiments, the computer readable instructions of computer program 743 is configured such that when executed by computer system 702, the computer readable instructions causes the apparatus 100 to perform steps described above (e.g., steps described above and below with reference to the flow charts shown in the drawings). In other embodiments, apparatus 100 may be configured to perform steps described herein without the need for a computer program. That is, for example, computer system 702 may consist merely of one or more ASICs. Hence, the features of the embodiments described herein may be implemented in hardware and/or software.

FIGS. 8A-F and FIGS. 9-10 are illustrative workspace displays depicting several screens according to some embodiments of the present invention. In some embodiments, the screens in FIGS. 8-15 may be shown on a graphical user interface of a display device electronically coupled with client device 115 and/or security sever 100. A user may interact with and navigate through the screens by operating an input device, which may, for example, include any combination of a mouse, a keyboard, audio input device, touch screen, and the like.

FIG. 8A is an illustrative workspace display depicting an alert configuration screen, according to some embodiments of the present invention. A plurality of interactive options 801a, 801b, 801c, and 801d may be depicted on a menu bar 800 of an illustrative workspace display. In response to user input indicating a selection of the "Alerts" option, such as, for example, a mouse click, additional interactive options 802a-c may be displayed. In response to user input on the "configure" interactive option 802a, the workspace display may generate a list 810 of zero or more configurable alerts 815a-e. Each configurable alert may include configurable parameters, such as, for example, Alert Type, Frequency, Notification, and Type. The Alert Type parameter may specify a unique security control, such as, for example, Norton Antivirus, McAfee Security, and Quick Heal applications. In some embodiments, each configurable alert 815a-e may comprise unique security control (Alert Type), notification type (Type), and address (Notification) parameters. The Frequency parameter may specify how often an alert may be sent to a recipient, such as daily, hourly, weekly, and/or monthly. The Notification parameter may specify the addresses, such an email address or telephone number, of one or more recipients of an alert. The Type parameter may specify the delivery mechanism for the alert, such as SMS or SMTP. The alert configuration screen may further comprise one or more interactive icons for modifying the list of alerts 810. For example, interactive icons 820a-c for adding, editing, and/or deleting an alert, respectively, may be provided for modifying alerts.

FIG. 8B is an illustrative workspace display depicting a risk assessment configuration screen, according to some embodiments of the present invention. In response to user input indicating a selection of the "Risk Assessment" option, such as, for example, a mouse click, additional interactive options 802d-f may be displayed. In response to user input on the "configure" interactive option 802d, the workspace display may generate an interactive menu 830 of security risks that may be monitored and controlled and are applicable to the risk transfer transaction. A user may select, using an input device such as a mouse, one or more security risks to indicate that the selected security risk is important to monitor and control. Once the user has selected (or deselected) one or more of the security risks, the user may select an "update" button (not shown) to update an active ontology of particular risks.

FIG. 8C is an illustrative workspace display depicting a risk assessment review/update assessment screen, according to some embodiments of the present invention. In response to user input on the "Review/Update Assessment" interactive option 802e, the workspace display may generate, in real time, a risk assessment table 840, such as a risk assessment for a specific date. The risk assessment table 840 enables a user to quickly identify the information assets and cyber risks that require additional security control implementation to sufficiently mitigate the risk. Risk assessment table 840 may display the configured risks based on the active controls, e.g., corresponding to the present or a specific date, and determines, for each risk, whether a security control or set of security controls mitigate the risk under each defined information asset (e.g., system, application, server, facility). For example, risk assessment table 840 shows a plurality of rows, with columns identifying a "Threat" (e.g., external), a "Threat Group" (e.g., Legislative Event, Volcanic Event, Weather Event), a "Rank" (e.g., 1), an "Information Asset" (e.g., a specific data center), and an indication, such as an "X" or checkmark, as to whether the Threat is Mitigated or not Mitigated.

FIG. 8D is an illustrative workspace display depicting a risk assessment grid screen, according to some embodiments of the present invention. In response to user input on the "Grid" interactive option 802f, the workspace display may generate, in real time, a risk assessment grid 850. The risk assessment grid 850 may comprise a plurality of rows, with each row corresponding to a "Risk" and any "Security Control" associated with a risk. For example, the depicted risk assessment grid 850 depicts a plurality of risks (LegislativeEvent, ChangeManagementEvent, Hazard, SecurityControlEvent, TrainingEvent, SystemEvent") and one or more security controls, if any, that mitigate that risk. Thus, the risk assessment grid 850 provides a visualization of the security controls that mitigate cyber risks to allow an entity to discover any cyber risks that lack sufficient risk mitigation.

FIG. 8E is an illustrative workspace display depicting a security control configuration screen, according to some embodiments of the present invention. In response to user input selecting the "Security Controls" interactive option 801c, the workplace display may display a plurality of options 802g and 802h. In response to user input selecting the "Configure Controls" 802g selectable option, a security control configuration screen 860 may be displayed. The security control configuration screen 860 may comprise a plurality of rows, with each row corresponding a unique security control, such as a software and/or hardware components and the part and/or process name on which it operates. For example, each security control may be associated with a Control Name (e.g., "Quick Heal Total Security"), a Port (e.g., "875"), and a Process Name (e.g., "quick.exe"). The security control configuration screen 860 may further comprise one or more interactive icons for modifying the list of security controls. For example, interactive icons 820a-c for adding, editing, and/or deleting a security controls, respectively, may be provided for modifying security controls.

FIG. 8F is an illustrative workspace display depicting a security control deployment configuration screen, according to some embodiments of the present invention. In response to user input selecting the "Configure Control Deployments" 802h option, a security control deployment configuration screen 970 may be displayed. The security control deployment configuration screen 870 depicts a table of one or more security control deployments. Each deployment may identify, for example, one or more of a "Control Name," a "Port," and a "Process Name" associated with a security control, a "Host," and an "Information Asset" or insured device or process. For each deployment, a user may specify whether status and/or performance of the security control may be monitored, e.g., by one or more monitoring agents 320.

FIG. 9 is an illustrative workspace display depicting a cyber security insurance policy risk assessment questionnaire screen, according to some embodiments of the present invention. In some embodiments, questionnaire screen 900 may be displayed in response to user input selecting the "Survey" option 801d in menu 800 depicted in FIGS. 8A-F. In some embodiments, such as where security control server 100 comprises a distributed system with multiple virtual and/or physical computers, the questionnaire screen 900 may be provided by a third-party. In other embodiments, the reasoning engine 230 of security control server 100 may employ the questionnaire module 231 to generate the questionnaire screen 900. The questionnaire screen 900 may include one or more questions to which the user may submit an answer via an input device. While questionnaire screen 900 depicts radio buttons indicating "yes" or "no" answers to the questions, other input means may be used, such as a text box, dropdown menu, or the like.

It will be appreciated that the embodiments disclosed herein offer technological improvements in computerized evaluation and monitoring of cyber threats and controls. In particular, the embodiments disclosed herein, when used in conjunction with software security controls, provide a technological improvement to computer technology for the evaluation and monitoring of cyber threats that provides an ability to assess and assign liability in a cyber insurance transaction between parties. While various embodiments have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

For example, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

For example, in some embodiments, the configuration of the risk model specific to the policy may be optional where there is a standard policy that conforms to a pre-configured risk model. In some embodiments, the insured client may not complete the questionnaire, for example, where the insurer does not require the survey, the client already completed a questionnaire. In some embodiments, the security control server 100 may discover the security controls from the questionnaire, a discovery mechanism, or inputs from an insured client regarding specific security controls and the metadata about their deployment (host name or IP address, port number, process name, etc.). In some embodiments, the insured client may configure the alerting component with information such as whom to alert and when. However, such configuration may be optional, and instead security control server 100 may be preconfigured to alert the insured risk manager and the insurer. Additionally, in some embodiments, the an external party, e.g., that supports control sever 100, may monitor the controls and alerts when they fail.

In some embodiments, the security control server 100 may implement the ranking of recommended security control features described above in connection with, inter alia, FIGS. 5A-C independently from the monitoring features described above in connection with, inter alia, FIGS. 6A-C. Thus, according to some embodiments, the security control server 100 may perform a ranking of recommended security control or monitoring of insured devices using external configuration data, or a combination of both.

The invention claimed is:

1. A method performed by an insured device in electronic communication with a security control server over an electronic communications network to assess risk associated with a cyber-liability insurance transaction pertaining to the insured device, the method comprising the steps of:
    operating, on the insured device, one or more security controls for mitigating a cyber-risk associated with a policy axiom generated by the security control server;
    operating, on the insured device, a security control monitoring agent; and
    receiving, from the security control server via the electronic communications network, an external monitoring configuration for the security control monitoring agent;
    wherein operating the security control monitoring agent comprises monitoring, by the monitoring agent, the one or more security controls on the insured device in accordance with the external monitoring configuration received from the security control server.

2. The method of claim 1, wherein the external monitoring configuration received from the security control server comprises, for each policy axiom associated with a security control, a name of a process that implements the security control, a port number that the security control listens to, a host identifier, and an alert mechanism that the monitoring agent should use to notify the security control server.

3. The method of claim 1, further comprising transmitting, from the insured device to the security control server, an alert that one or more security controls for the mitigated risk is not operational in accordance with the policy axiom generated by the security control server.

4. The method of claim 3, wherein the alert is only transmitted if there is no operational backup or alternate security control on the insured device that addresses the cyber-risk.

5. The method of claim 3, wherein the alert is also transmitted to a cyber-liability insurance customer.

6. An insured device in electronic communication with a security control server over an electronic communications network to assess risk associated with a cyber-liability insurance transaction pertaining to the insured device, the insured device comprising:
    a processor;
    a memory coupled to the processor;
    a network interface coupled to a network, wherein the processor is configured to:
    operate one or more security controls for mitigating a cyber-risk associated with a policy axiom generated by the security control server;
    operate a security control monitoring agent; and
    receive, from the security control server via the network, an external monitoring configuration for the security control monitoring agent;
    wherein the security control monitoring agent is operated to monitor the one or more security controls on the insured device in accordance with the external monitoring configuration received from the security control server.

7. The device of claim 6, wherein the external monitoring configuration received from the security control server comprises, for each policy axiom associated with a security control, a name of a process that implements the security control, a port number that the security control listens to, a host identifier, and an alert mechanism that the monitoring agent should use to notify the security control server.

8. The device of claim 6, wherein the processor is further configured to transmit, from the insured device to the security control server, an alert that one or more security controls for the mitigated risk is not operational in accordance with the policy axiom generated by the security control server.

9. The device of claim 8, wherein the processor is configured to transmit the alert only if there is no operational backup or alternate security control on the insured device that addresses the cyber-risk.

10. The device of claim 8, wherein the alert is also transmitted to a cyber-liability insurance customer.

11. A computer program product for assessing risk associated with a cyber-liability insurance transaction pertaining to an insured device, the computer program product comprising a non-transitory computer readable medium containing instructions for a processor to:
    operate one or more security controls on an insured device for mitigating a cyber-risk associated with a policy axiom generated by a security control server;
    operate a security control monitoring agent o the insured device; and
    receive, from the security control server via the network, an external monitoring configuration for the security control monitoring agent;

wherein the security control monitoring agent is operated to monitor the one or more security controls on the insured device in accordance with the external monitoring configuration received from the security control server.

12. The computer program product of claim 11, wherein the external monitoring configuration received from the security control server comprises, for each policy axiom associated with a security control, a name of a process that implements the security control, a port number that the security control listens to, a host identifier, and an alert mechanism that the monitoring agent should use to notify the security control server.

13. The computer program product of claim 11, wherein the non-transitory computer readable medium further comprises instructions executable by a processor to transmit, from the insured device to the security control server, an alert that one or more security controls for the mitigated risk is not operational in accordance with the policy axiom generated by the security control server.

14. The computer program product of claim 13, wherein the non-transitory computer readable medium further comprises instructions executable by the processor to transmit the alert only if there is no operational backup or alternate security control on the insured device that addresses the cyber-risk.

15. The computer program product of claim 13, wherein the non-transitory computer readable medium further comprises instructions executable by the processor to transmit the alert to a cyber-liability insurance customer.

* * * * *